(12) United States Patent
Karasudani

(10) Patent No.: US 7,197,238 B2
(45) Date of Patent: Mar. 27, 2007

(54) FILE SYSTEM, STORAGE AREA MANAGING METHOD, AND STORAGE MEDIUM THEREOF

(75) Inventor: Akira Karasudani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1403 days.

(21) Appl. No.: 09/911,776

(22) Filed: Jul. 24, 2001

(65) Prior Publication Data

US 2002/0091668 A1 Jul. 11, 2002

(30) Foreign Application Priority Data

Jan. 9, 2001 (JP) .............................. 2001-001291

(51) Int. Cl.
*H04N 5/85* (2006.01)
*H04N 5/90* (2006.01)
(52) U.S. Cl. ...................................... 386/126; 386/125
(58) Field of Classification Search ................ 386/125, 386/124, 126, 45, 46, 105, 106, 1
See application file for complete search history.

(56) References Cited

U.S. PATENT DOCUMENTS 5,974,503 A * 10/1999 Venkatesh et al. .......... 711/114

6,584,278 B2 * 6/2003 Ando et al. ................... 386/98
6,633,926 B1 * 10/2003 Harada et al. ................ 710/22
7,068,921 B1 * 6/2006 Park ........................... 386/125

FOREIGN PATENT DOCUMENTS

| JP | 8-221303 | 8/1996 |
|---|---|---|
| JP | 9-319627 | 12/1997 |
| JP | 2000-200207 | 7/2000 |

* cited by examiner

*Primary Examiner*—Robert Chevalier
(74) *Attorney, Agent, or Firm*—Greer, Burns & Crain, Ltd.

(57) ABSTRACT

Video data is managed in units of management blocks set in a storage area of a storage device. An access to the storage device is made in an access unit obtained for each video according to an encoding rate, etc. Additionally, a video is recorded so that only video data of the same program is recorded in one management block. As a result, an empty area can be prevented from being fragmented, and videos can be recorded even if the video data are recorded/reproduced at different encoding rates from a plurality of channels.

21 Claims, 20 Drawing Sheets

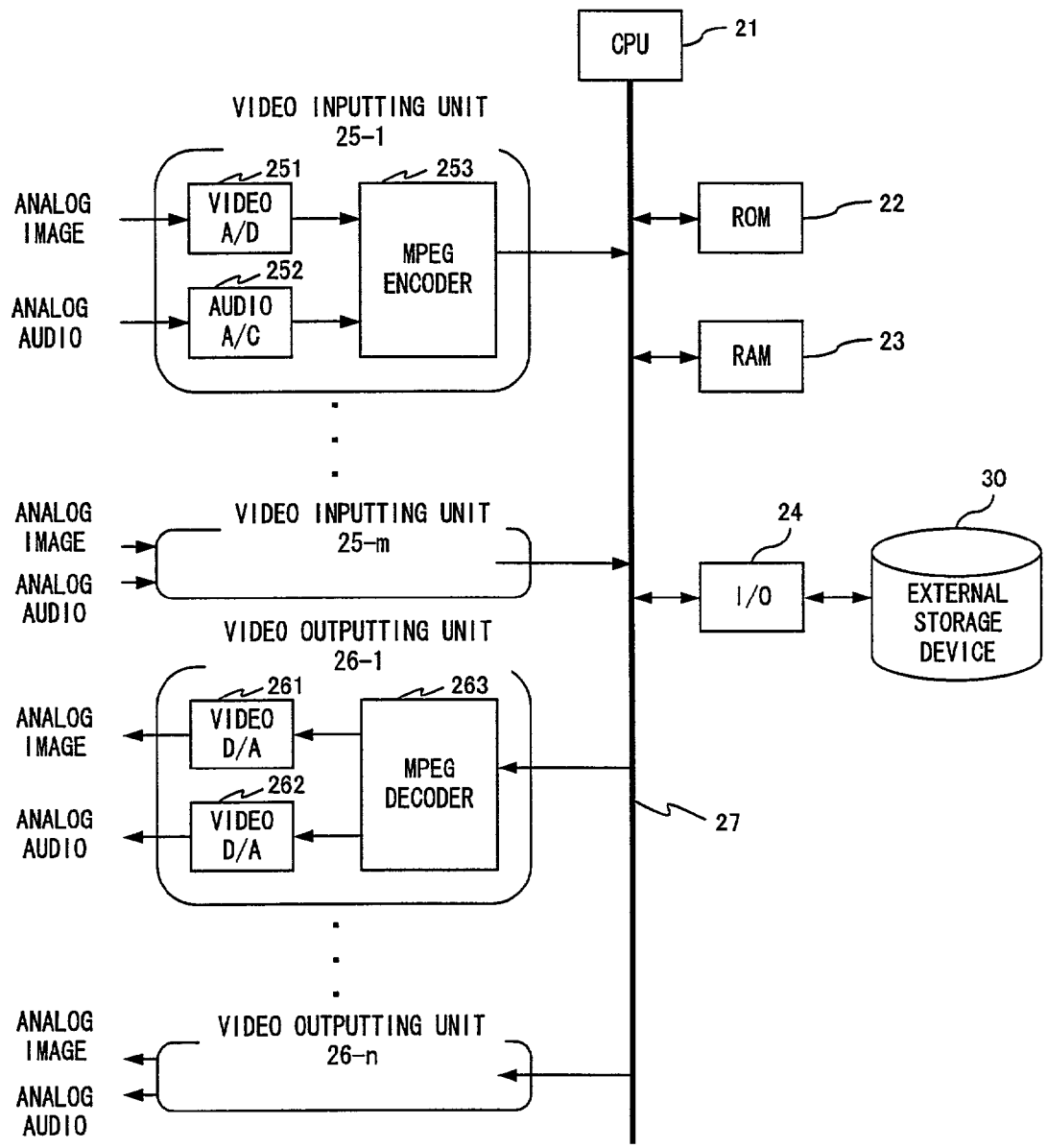
F I G. 4

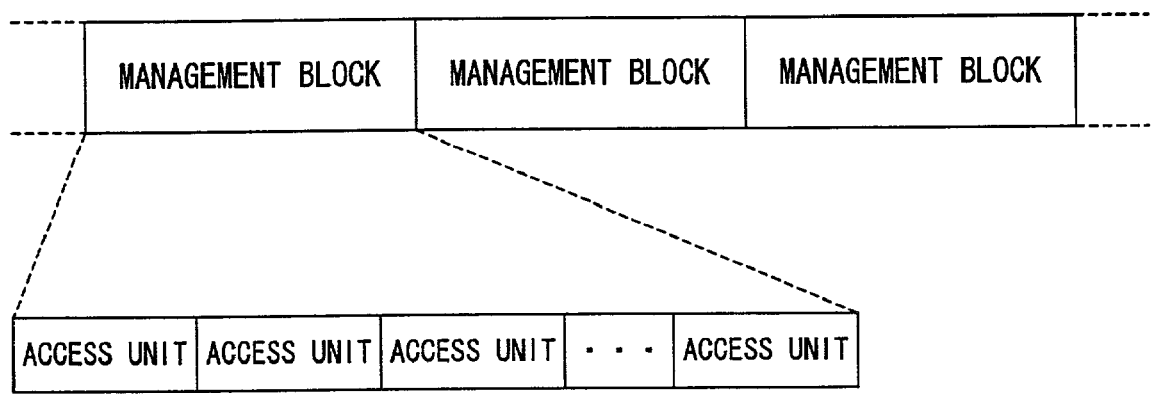
F I G. 5

| VIDEO TABLE | | |
|---|---|---|
| VIDEO TO BE RECORDED | ENCODING RATE | VIDEO IDENTIFIER |
| VIDEO A | 8Mbps | 1 |
| VIDEO B | 8Mbps | 2 |
| VIDEO C | 8Mbps | 3 |
| ... | ... | ... |
| VIDEO D | 8Mbps | 10 |

ACCESS UNIT IS SET BY ACCESS UNIT DETERMINING UNIT FOR EACH VIDEO

| VIDEO IDENTIFIER | ACCESS UNIT |
|---|---|
| 1 | 256KB |
| 2 | 256KB |
| 3 | 256KB |
| ... | ... |
| 10 | 256KB |

STRUCTURE OF MANAGEMENT BLOCK TABLE MEMBER

| VIDEO IDENTIFIER | START ADDRESS | END ADDRESS | POINTER TO NEXT MANAGEMENT BLOCK TABLE MEMBER |
|---|---|---|---|

VIDEO TABLE (61)

| VIDEO | PROCESSING TYPE | ENCODING RATE | VIDEO IDENTIFIER |
|---|---|---|---|
| A | RECORDING | 8Mbps | 1 |
| B | RECORDING | 8Mbps | 2 |
| C | RECORDING | 24Mbps | 3 |
| ... | ... | ... | ... |
| D | REPRODUCTION | 24Mbps | 10 |

VIDEO CONDITION CHANGE (VIDEO B) →

VIDEO TABLE (63)

| VIDEO | PROCESSING TYPE | ENCODING RATE | VIDEO IDENTIFIER |
|---|---|---|---|
| A | RECORDING | 8Mbps | 1 |
| B | RECORDING | 24Mbps | 2 |
| C | RECORDING | 24Mbpd | 3 |
| ... | ... | ... | ... |
| D | REPRODUCTION | 24Mbps | 10 |

VIDEO ERASURE (VIDEO B) AND ADDITION (VIDEO E) →

VIDEO TABLE (62)

| VIDEO | PROCESSING TYPE | ENCODING RATE | VIDEO IDENTIFIER |
|---|---|---|---|
| A | RECORDING | 8Mbps | 1 |
| C | RECORDING | 24Mbps | 3 |
| ... | ... | ... | ... |
| D | REPRODUCTION | 24Mbps | 10 |
| E | RECORDING | 4Mbps | 11 |

F I G. 19A
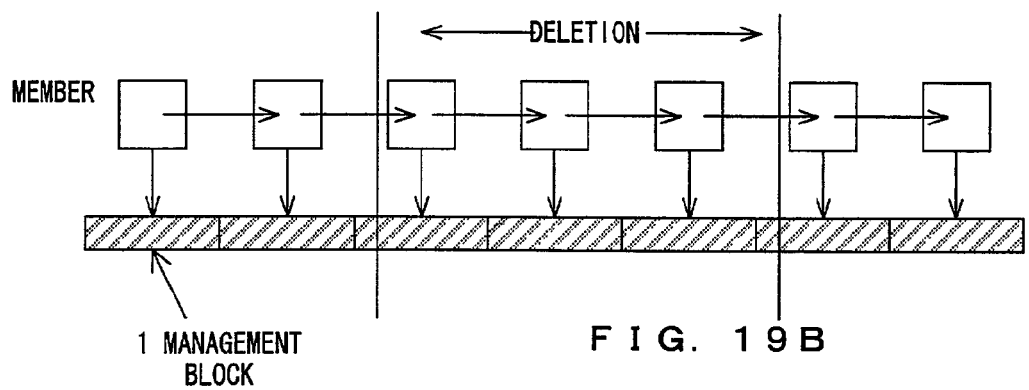
F I G. 19B
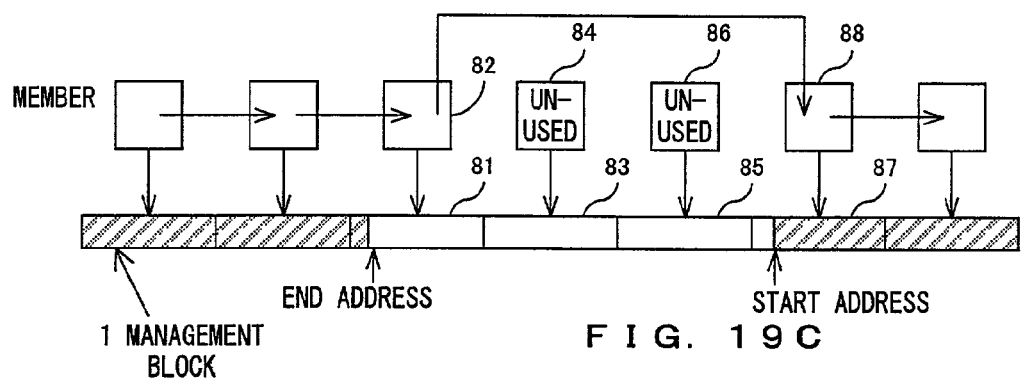
F I G. 19C
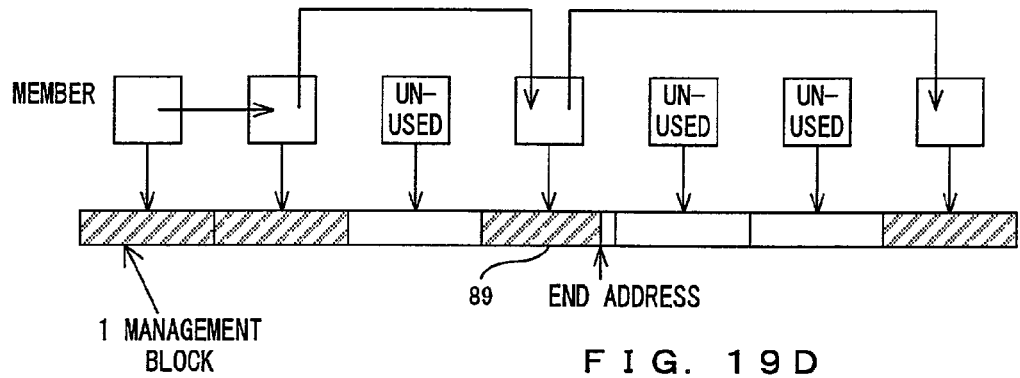
F I G. 19D

FILE SYSTEM, STORAGE AREA MANAGING METHOD, AND STORAGE MEDIUM THEREOF

BACKGROUND OF THE INVENTION

1. Field of the Invention

The present invention relates to a file system of a randomly accessible storage device, and more particularly, to a file system for a storage device accessed by a plurality of channels.

2. Description of the Related Art

In recent years, digitization of broadcasting has been rapidly advancing. In Japan, full-scale digital broadcasting services were launched at the end of 2000, and also ground wave digital broadcasting is planned to make its debut. With the digitization of broadcasting, also a video recording method has been digitized. A variety of storage devices for storing MPEG videos of a digital broadcast are proposed. For example, the storage devices for storing MPEG videos are not only a sequentially accessible medium such as a D-VHS which is one type of VTR, but also a randomly accessible medium such as an MO, an HDD, etc., which have been used for a PC so far.

As a medium recording a video, a sequential access medium such as a VTR has been chiefly used. However, a randomly accessible medium such as an HDD, a magneto-optical disk, etc. has been attracting public attention as a video storage medium in recent years. A video storage medium implemented by the randomly accessible medium is expected to provide brand-new video applications such as simultaneous recording/reproduction of a plurality of channels, time-shifting reproduction, etc.

To a sequential access medium, only a unidirectional access can be made. In the meantime, the above described randomly accessible medium is characterized in that any location within the medium can be accessed freely. By taking advantage of the upside of this randomly accessible medium, new applications implementing operations such as simultaneous recording/reproduction of videos of a plurality of channels, time shifting such as time-shifting reproduction, a fast jump to a desired location, editing within the same medium, etc. are under study.

When a plurality of channels are simultaneously processed or time-shifting-reproduced, video data of the plurality of channels must be simultaneously recorded/reproduced. In this case, the video data of all of the channels must be processed without delay. Accordingly, the data must be read/written from/to the medium until the buffer for video data of each channel underflows or overflows.

Therefore, when videos of a plurality of channels are handled, a method interleaving and storing videos in an order of nearer processing time limits, or a method partitioning an area for each video, and sequentially storing the video within a medium is conventionally used.

FIG. 1 exemplifies the configuration of a file system when videos of a plurality of channels are interleaved and stored. The file system 10 shown in this figure comprises an accessing unit 11, a block searching unit 12, a block allocating unit 13, and a block table 14.

Additionally, the file system 10 for a storage device recording/reproducing a plurality of channels allocates a buffer 20 for each channel (for each recording/reproduction in the case of time-shifting reproduction, etc.) of a video to be recorded/reproduced, and issues an input/output request to an external storage device in an order of nearer processing time limits by recognizing a time point at which the buffer overflows (at the time of recording) or underflows (at the time of reproduction) to be a processing time limit.

The accessing unit 11 calls the block searching unit 12 and the block allocating unit 13 in response to a video recording/reproduction request, and instructs the external storage device to read/write video data based on these notifications. The block searching unit 12 is called by the accessing unit 11 at the time of reproduction, and notifies the accessing unit 11 of the block in which the video data to be reproduced is stored by referencing the block table 14. Note that a block referred to in this specification indicates a minimum logical recording unit when the file system instructs the external storage device to read/write data. The block allocating unit 13 is called by the accessing unit at the time of recording, and notifies the accessing unit 11 of an empty area for storing the video by referencing the block table 14. The block table 14 is a table that manages the storage area of the external storage device in units of blocks, and also manages which video data is stored in each block.

When a video is reproduced, a video reproduction request is first issued to the accessing unit 11 [(1)]. In response to this request, the accessing unit 11 calls the block searching unit 12 [(2)-1]. The block searching unit 12 references the block table 14 [(3)-1], searches for the block allocated to the data to be read [(4)-1], and notifies the accessing unit 11 of the searched block [(5)-1]. The accessing unit 11 then instructs the external storage device to read the data from this block, so that the data within the corresponding block is written to the buffer [(6)].

Similarly, when a video is recorded, a video recording request is first issued to the accessing unit 11 [(1)]. In response to this request, the accessing unit 11 calls the block allocating unit 13 [(2)-2]. The block allocating unit 13 references the block table 14 [(3)-2], and searches for a block yet to be allocated [(4)-2]. The block allocating unit 13 then allocates the block yet to be allocated as a block in which the video data is to be stored, and notifies the accessing unit 11 of the allocated block [(5)-2]. Lastly, the accessing unit 11 instructs the external storage device to write the data, so that the data within the buffer is written to the allocated block [(6)].

FIGS. 2A and 2B explain the fragmentation of a storage area when videos of a plurality of channels are interleaved and stored.

If data is interleaved and stored in a device which simultaneously processes videos of a plurality of channels, the video data are sequentially written to an external storage device in an order of nearer processing time limits in a buffer. If the videos are repeatedly recorded/reproduced or erased by changing the number of channels to be recorded and/or an encoding rate of each channel, a storage area is fragmented.

FIGS. 2A and 2B show the states of a storage area within a medium in the case where after video data from three channels are recorded, one piece of video data is erased, and video data is newly recorded from a different channel. FIG. 2A shows the state of the storage area in the case where videos A, B, and C with the same encoding rate are sequentially recorded in a medium by being switched from a video A, a video B, to a video C, . . . in an order of nearer processing time limits in the video buffer 20. In the meantime, FIG. 2B shows the state of the storage area in the case where a video D with an encoding rate that is higher than that of the video C is newly recorded, after the data of the video C is erased from the state shown in FIG. 2A.

If data are repeatedly written in an interleaving manner or erased while changing an encoding rate or the number of channels as shown in FIG. 2B, an empty area within the storage area is fragmented into a plurality of smaller areas. If the size of an empty area is fragmented into a size that cannot store a video, storage efficiency is degraded.

For example, FIG. 2B shows the case where after the data of the video C is erased from the state of FIG. 2A, in which the videos A, B, and C are stored in the storage area, the video D with the encoding rate higher than that of the video C is recorded. Because the encoding rate of the video D is higher than that of the video C, the size of the data of the video D, which is stored at one time, is larger than that of the data of the video C. Accordingly, the size of the area emptied by erasing the video C is too small to record the data of the video D. The data of the video D is therefore stored in another larger empty area. If the number of channels is changed, or if videos with different encoding rates are repeatedly recorded/reproduced as described above, the number of unavailable fragmented areas increases, leading to degradation in the storage efficiency. Finally, a defragmentation process for gathering fragmented empty areas must be performed.

Next, a method partitioning a storage area for respective videos within a medium, and sequentially storing the videos is explained with reference to FIGS. 3A and 3B.

With the method shown in FIGS. 3A and 3B, a storage area is partitioned into a plurality of areas, which are allocated to respective videos.

FIG. 3A shows the state where videos A, B, and C with the same encoding rate are stored in respective areas, whereas FIG. 3B shows the case where data of a video D is newly stored after part of the video C is erased from the state shown in FIG. 3A by being edited.

The method partitioning a storage area and storing videos is a method storing only video type in a collected area. Therefore, even if an empty space is generated by being edited as shown in FIG. 3B, and the total sum of this area has a capacity that can store the video D, the data of the video D cannot be stored in this storage area. If the video D is newly stored, an area for the video D must be secured.

If recording, reproduction, or erasure is repeated also when a storage area is partitioned for videos, which are sequentially stored in these areas, an empty area is repeatedly fragmented. As a result, it becomes impossible to secure a collected area in which data can be sequentially recorded, so that the need for making defragmentation arises.

SUMMARY OF THE INVENTION

An object of the present invention is to provide a file system and a storage area managing method, which record data without degrading storage efficiency when a video is recorded in a storage device implemented by the above described random access medium.

Another object of the present invention is to provide a file system and a storage area managing method, which can prevent storage efficiency from degrading even if video data with different encoding rates are repeatedly recorded and erased.

A further object of the present invention is to provide a file system and a storage area managing method, which do not need to make defragmentation even if data is repeatedly recorded/erased.

A still further object of the present invention is to provide a file system and a storage area managing method, which can store/reproduce videos without delay, even if the video are recorded and reproduced from a plurality of channels.

A still further object of the present invention is to provide a file system and a storage area managing method, which can cope with a change that occurs in the number of channels or an encoding rate during recording/reproduction of a video.

A still further object of the present invention is to provide a file system and a storage area managing method, which can easily edit data recorded in a storage device.

To solve the above described problems, a file system according to the present invention, which is a file system of a device simultaneously recording/reproducing videos in/from a randomly accessible storage unit, comprises an access unit determining unit and an accessing unit from one or a plurality of channels.

The access unit determining unit determines an access unit, which is the size of an access made to the storage unit for each video to be recorded/reproduced.

The access unit determining unit determines, for example, the size of an access unit which satisfies the following condition.

a transfer time of data by the access unit> processing time for data accumulated during an overhead processing time period that the storage unit requires to transfer data The accessing unit records a video in the above described unit of an access, so that one video data of the same program is recorded within each of management blocks set in the storage area of the storage unit, when the video is recorded in the storage unit.

As a result, a video is recorded/reproduced in an access unit of a suitable size determined by the access unit determining unit, whereby processing can be performed without interrupting the video.

Additionally, only video data of the same program is recorded in one management block, thereby managing the video in units of management blocks.

Furthermore, the file system according to the present invention may further comprise a data erasing unit erasing the video stored in the storage unit in the above described management blocks.

Since an empty area within the storage area of the storage unit does not become smaller than the size of a management block in this case, the empty area is never fragmented. Accordingly, the need for making defragmentation does not arise.

Still further, the file system according to the present invention may further comprise a management block determining unit determining the size of the above described management block according to the random access performance of the storage unit, and the maximum of access performance requested of the storage unit, and a formatting unit initializing the storage unit based on the size of the management block, which is determined by the management block determining unit.

With this configuration, a suitable management block is set for the storage unit.

BRIEF DESCRIPTION OF THE DRAWINGS

FIG. 4 exemplifies the configuration of a host system in which a file system according to a preferred embodiment runs;

FIG. 5 shows a model of a storage area for explaining how to manage a storage area;

FIG. 10 exemplifies the structure of a member configuring the management block table;

FIG. 14 exemplifies a change in the settings of the video table;

FIGS. 19A, 19B, 19C, and 19D show the process performed when editing to delete a halfway portion of a video is performed.

DESCRIPTION OF THE PREFERRED EMBODIMENTS

Figure 1:
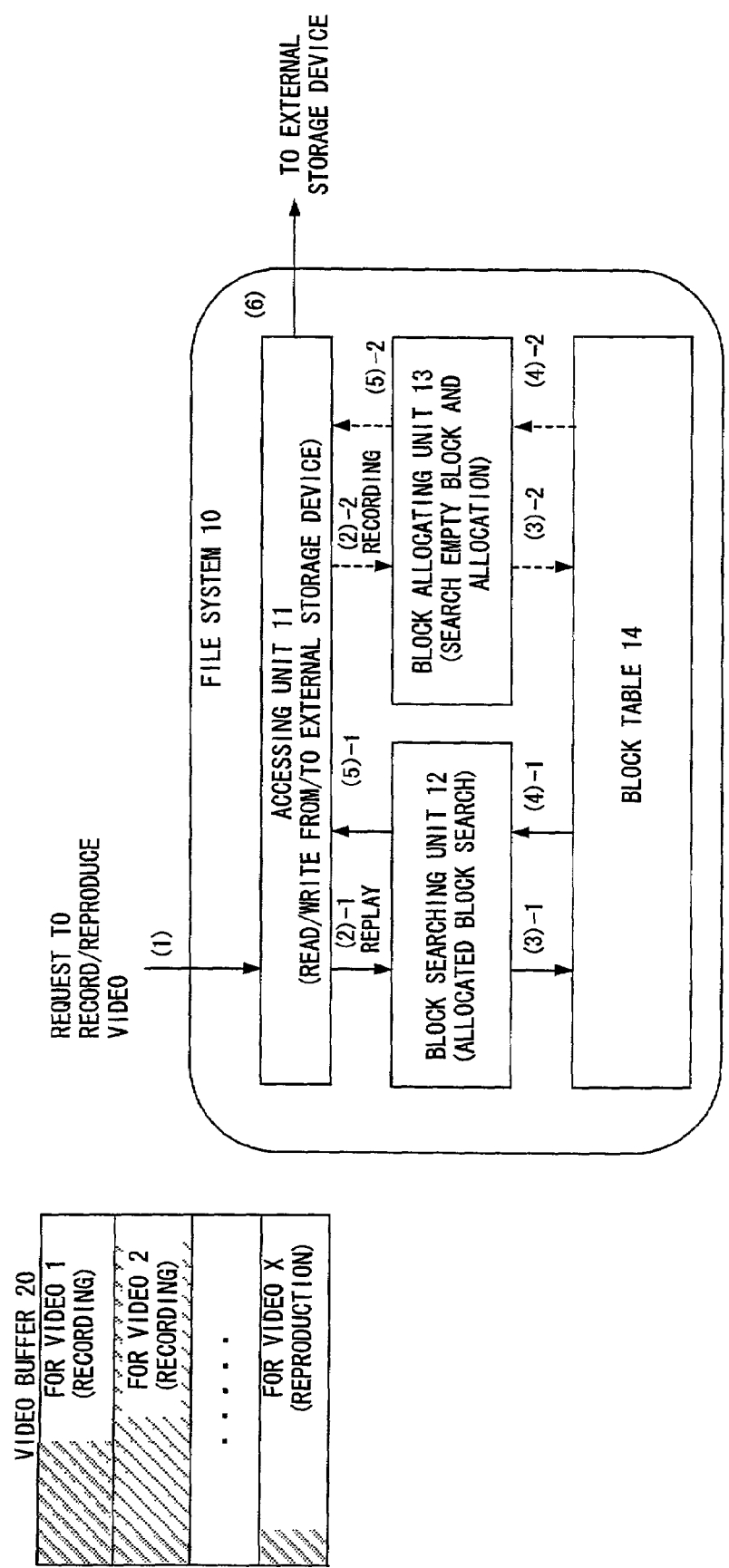
FIG. 1 exemplifies the configuration of a file system when videos of a plurality of channels are interleaved and stored.
Figure 2A:
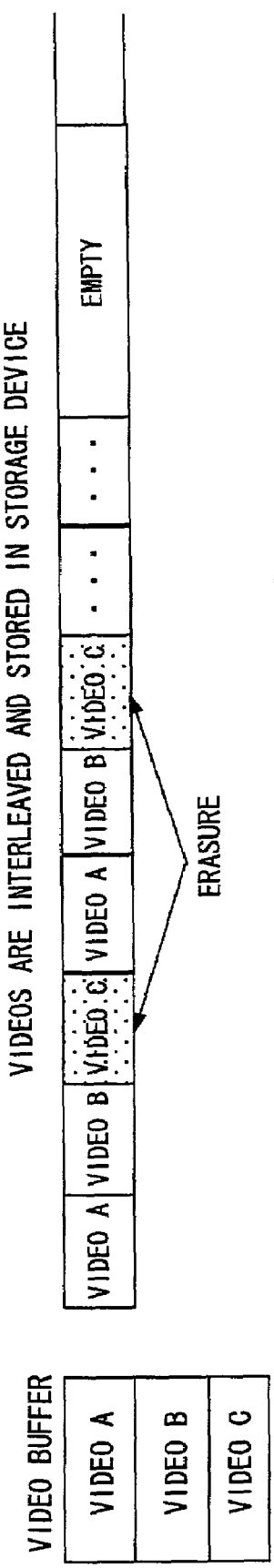
FIGS. 2A and 2B explain the fragmentation of a storage area when videos of a plurality of channels are interleaved and stored.
Figure 2B:
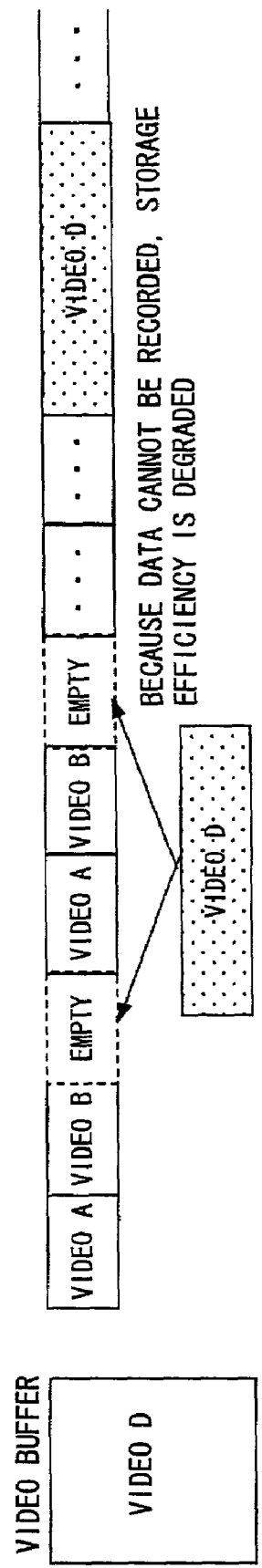
Figures 3A, 3B:
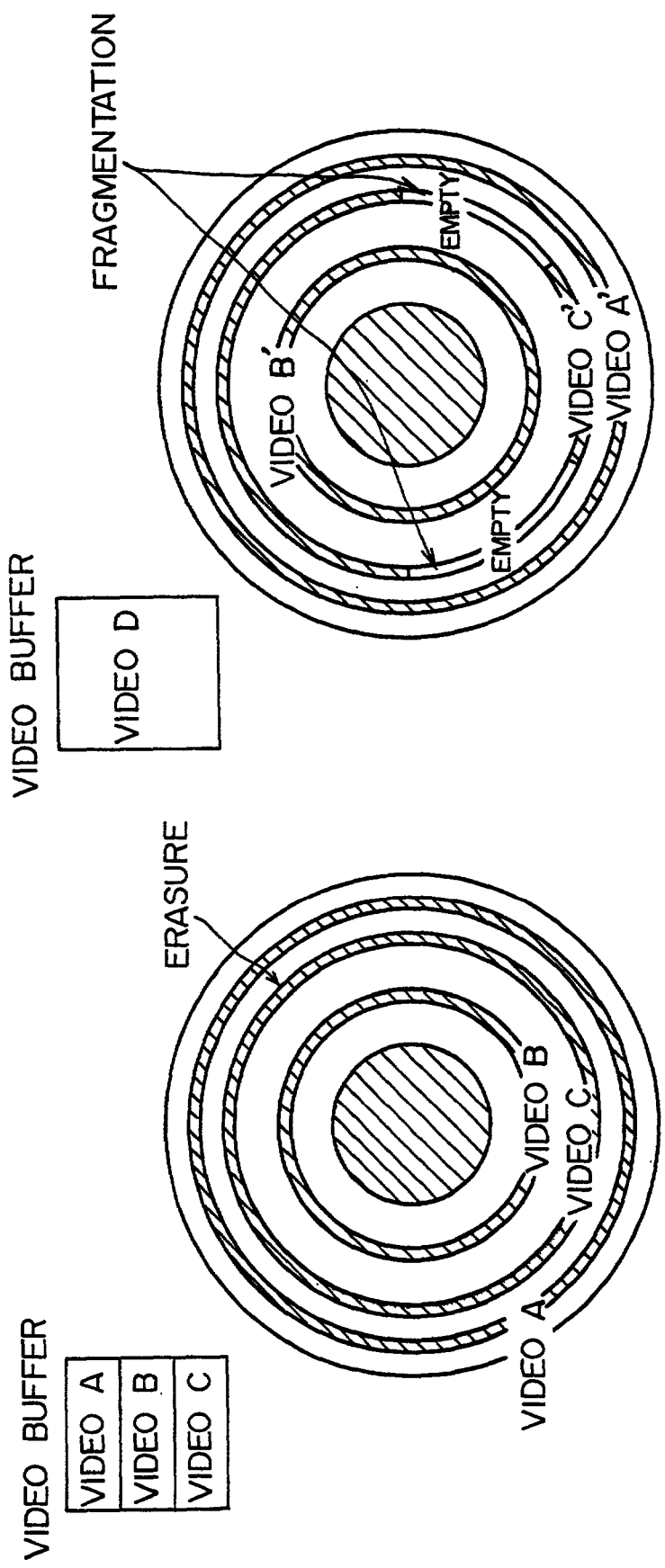
FIGS. 3A and 3B explain a method partitioning a storage area for respective videos within a medium, and sequentially storing the videos.

FIG. 4 exemplifies the configuration of a host system in which a file system according to a preferred embodiment runs.

The host system shown in this figure comprises a CPU 21, a ROM 22, a RAM 23, an I/O interface 24 with an external storage device 30, a plurality of video inputting units 25 each processing data of a video to be recorded, a plurality of video outputting units 26 each processing data of a video to be reproduced, and a bus 27 interconnecting the above described constituent elements. Each of the video inputting units 25 comprises a video A/D converter 251, an audio A/D converter 252, and an MPEG encoder 253. Each of the video outputting units 26 comprises a video D/A converter 261, an audio D/A converter 262, and an MPEG decoder 263. Any storage medium such as a hard disk, an MO, a DVD, etc. may be available as the external storage device 30 as far as the medium has a capacity large enough to record a video, and data can be randomly read/written from/to the medium. Additionally, this system externally comprises the storage medium 30 as a means for storing video or audio data. However, the means for storing video or audio data may be arranged within this system.

With this system, the CPU 21 executes a program stored in the ROM 22 to control the entire system. A file system for use in this system is installed as a program stored in the ROM 22 or the RAM 22, which is executed by the CPU 21.

The file system according to the present invention may be implemented not only as one capability of an OS or software such as a driver, etc., as in the system shown in FIG. 4, but also as firmware or dedicated hardware.

When a video is recorded, video and audio analog signals input to the video inputting unit 25 are first converted into digital data via the video A/D converter 251 and the audio A/D converter 252. Then, the digital data are converted into MPEG data by the MPEG encoder 253, and temporarily stored in a buffer arranged for each channel in the RAM 23. When sufficient data is stored in the buffer, the CPU 21 reads the file system, which then stores the data within the buffer in the external storage device 30 via the I/O interface 24.

When a video is reproduced, it is first verified whether or not the buffer arranged in the RAM 23 has a sufficiently empty space. Then, the file system is called. The file system reads video/audio data from the external storage device 30, and temporarily stores the read data in the buffer. When sufficient data is stored in the buffer, the data is output to the video outputting unit 26. After the compressed data is decoded by the MPEG decoder 263 within the video outputting unit 26, the decoded data is restored to analog signals by the video D/A converter 261 and the audio D/A converter 262, and outputted.

Next, a method managing a storage area, which is executed by the file system in this preferred embodiment, is described. Although the following description only refers to a process for video data for ease of explanation, a similar process is performed also for audio data having the same constituent elements as those of the video data. Additionally, "video" simply referred to in this specification corresponds to both data including not only image data, but also all pieces of data required for reproducing a video, such as audio data, control data, etc., or part of data of a partial video, such as only image data, only audio data, etc.

FIG. 5 shows a model of a storage area for explaining how to manage the storage area, which is executed by the file system in this preferred embodiment.

In this preferred embodiment, the file system manages the storage area of the external storage device 30 by using two management units such as a management block and an access unit.

The management block is a management unit used when the file system manages a storage area. The file system reads/write data from/to the external storage device 30 by specifying to which management block an access is to be made. All of management blocks are equal in size, and each of the blocks is in a one-to-one correspondence with a logical area in the external storage device 30. Note that the size of a management block and the logical location of each management block in the external storage device 30 are determined when the external storage device 30 is initialized (formatted). A management block to which data is to be written is selected in a way such that the entire video data recorded in one management bock is data for the same video data. Additionally, data is erased in the above described management blocks.

The access unit is a management unit when the file system makes an access. When reading/writing data from/to the external storage device 30, the file system uses the size of this access unit as a basic unit. The access unit has a size of 1/integer of the management block size. Accordingly, the management block is configured by a plurality of access units as shown in FIG. 5. An access unit size is determined according to conditions such as an encoding rate, the number of channels, etc., when an access is started.

The file system sets management blocks when the external storage device 30 is formatted, and allocates a management block, which has an empty area, when recording video data. Additionally, at this time, the file system determines an access unit the size of which is determined according to an encoding rate of a channel, etc., when recording video data within a management block.

Figures 6A, 6B:
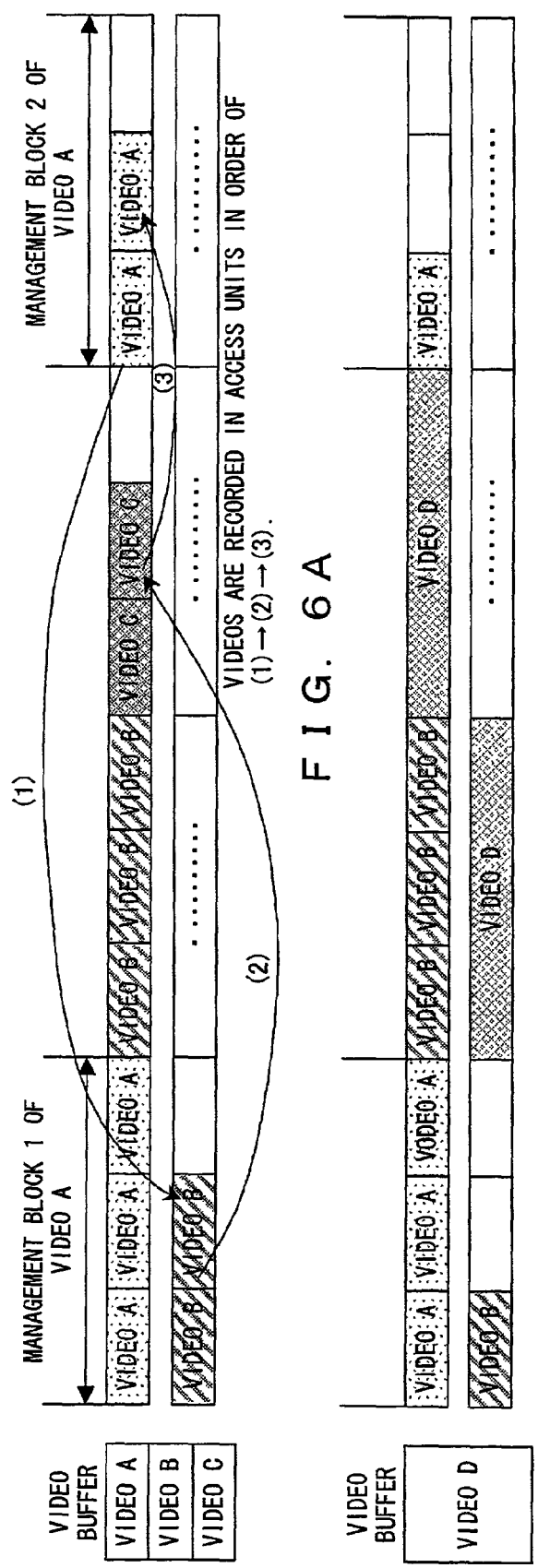
FIGS. 6A and 6B explain how to record video data.

FIGS. 6A and 6B explain how to record video data, which is performed by the file system according to this preferred embodiment.

In this preferred embodiment, when data is stored in the external storage device 30, an optimum size of an access unit is obtained according to conditions such as an encoding rate, the number of channels, etc. at the start of an access, and a video to be written is switched in the access unit, so that the video data is recorded.

FIG. 6A shows the case where data of videos A, B, and C with the same encoding rate are recorded from three channels in the external storage device 30.

With this file system, one video data of the same program is stored in one management block. Therefore, management blocks are respectively allocated to the respective videos such as the video A, the video B, . . . as shown in this figure, when the video data are stored.

Additionally, the video data are stored by switching the videos to be processed in access units in the order of nearest processing time limits within the buffer, such as the videos A, B, C, A, B, . . . , and as indicated by arrows shown in FIG. 6A, when the video data are stored. If a management block allocated at the preceding time still has an empty space, the video data is recorded in this block to make the video data continue. Or, if no such management block exists, a new management block is allocated to the video data, which is then recorded. Since the videos A, B, and C are recorded with the same encoding rate in the case shown in FIG. 6A, all of their access units are one-thirds of a management block.

As described above, in this preferred embodiment, data are stored in management blocks allocated to respective videos by skipping a recording position. Therefore, one video data of the same program is stored in one management block, for example, the data of the video A occupies the whole of a management block 1 as shown in FIG. 6A. Furthermore, data is switched and stored in units of the size of 1/natural number of a management block obtained beforehand, so that data of the same video can be filled and recorded in each management block. Accordingly, video data can be erased in units of management blocks, so that the minimum unit of an empty area yet to be allocated becomes the size of a management block, and the empty area is not fragmented.

FIG. 6B shows the state where a video D is newly recorded with an encoding rate faster three times that of the video C, after the data of the video C is erased from the state shown in FIG. 6A.

Since the video D has the encoding rate faster three times that of the video C, a time period until the processing time limit of the buffer is one-thirds of the video C. To process the video D, the access unit becomes a multiple of 3 of the video C (a method determining the size of an access unit will be described in detail later).

Therefore, the access unit of the video D results in the size of one management block. However, since data is erased in units of management blocks with this system, the data of the video D can be stored in the area where the video C was previously stored. As a result, an empty area can be prevented from being fragmented.

As described above, with the file system according to this preferred embodiment, a storage area is prevented from being fragmented, even if data is repeatedly recorded/erased, or data is recorded at an encoding rate changed.

Figure 7:
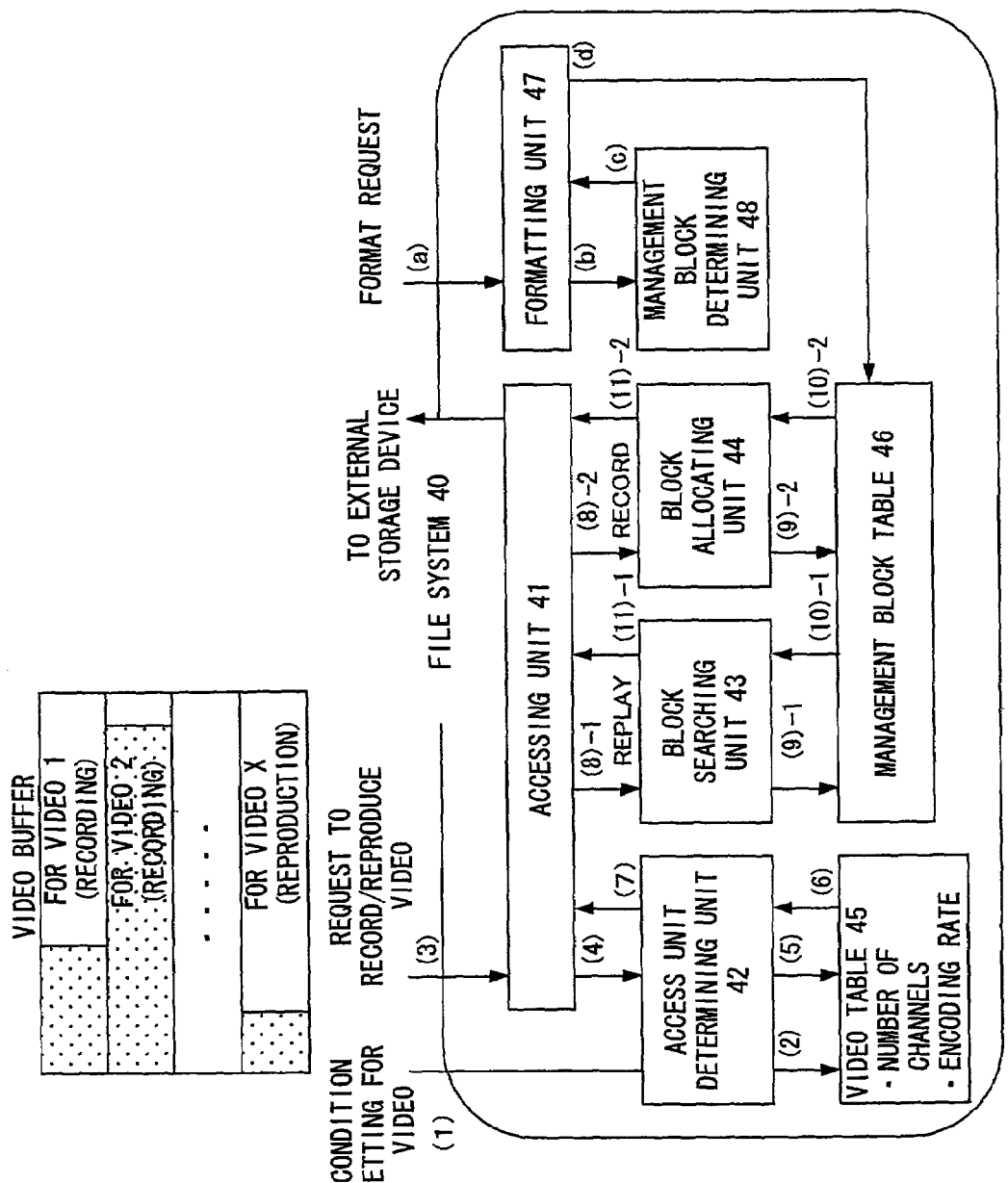
FIG. 7 exemplifies the configuration of the file system.

FIG. 7 exemplifies the configuration of the file system according to this preferred embodiment.

The file system 40 according to this preferred embodiment comprises an accessing unit 41, an access unit determining unit 42, a block searching unit 43, a block allocating unit 44, a video table 45, a management block table 46, a formatting unit 47, and a management block determining unit 48.

The accessing unit 41 instructs the external storage device 30 to read/write data, and manages the data transfer between the external storage device 30 and a buffer in the RAM 23. The access unit determining unit 42 determines an access unit according to conditions of each video, such as an encoding rate, etc. When being called by the accessing unit 41, the access unit determining unit 42 determines the size of a unit block by referencing the video table 45. The block searching unit 43 searches for an allocated management block by referencing the management block table 46, when a video is reproduced. The block allocating unit 44 determines a management block to be allocated to video data. When video data is recorded, the block allocating unit 44 searches for an unused management block by referencing the management block table 46, and allocates the management block in which data is to be recorded. The video table 45 is a table in which conditions for determining the size of an access unit are set. Before a video is recorded/reproduced, conditions such as an encoding rate of a video, the number of channels, etc. are set by the access unit determining unit 42 in this table. In response to a recording/reproduction request, the access unit determining unit 42 determines an access unit by referencing this video table 45. The management block table 46 is a table for managing each management block. This table stores the connection relationship between management blocks, an identifier for identifying a video allocated to each management block, and information indicating the use state of a management block. The formatting unit 47 governs the process performed when the external storage device 30 is formatted, and initializes the management block table 46 in response to a format request. The management block determining unit 48 determines the size of a management block according to an instruction from the formatting unit 47, when the external storage device 30 is formatted.

With the file system 40 shown in FIG. 7, conditions such as an encoding rate of a video, the number of channels, etc. are first set in the video table 45 at the start of recording/reproduction of a video. Then, the file system 40 generates an input/output request issued to the external storage device 30 in an order of nearer processing time limits in the buffer of respective video channels.

When a video is recorded, the accessing unit 41 calls the access unit determining unit 42, which determines an access unit of each video. Next, the accessing unit 41 calls the block allocating unit 44, and makes the block allocating unit 44 search for a management block in which video data is to be recorded by referencing the management block table 46. At this time, a management block that is already allocated to the video to be recorded and still has an empty space is first searched among already allocated management blocks. If no corresponding block is found, a management block yet to be allocated is searched and newly allocated. Lastly, the accessing unit 41 writes data to the allocated management block in access units.

Similarly, when a video is reproduced, the block searching unit 43 searches for the management block in which the video data requested to be reproduced is recorded, and notifies the accessing unit 41 of the searched block. The accessing unit 41 then instructs the external storage device 30 to read the data in access units.

Prior to use, the external storage device 30 must be formatted to set management blocks therein. In the file system 40, the formatting unit 47 calls the management block determining unit 48 in response to a format request, and the management block determining unit 48 determines the size of a management block. At this time, the management block is set to a size with which a sufficiently high transfer speed, at which an overhead such as a seek time, a rotational latency, etc. can be absorbed, can be obtained to allow the video to be recorded/reproduced without being interrupted even at a random access.

Next, operations of the file system 40 are explained in detail. Numerals (1) to (12) in the following explanation correspond to those shown in FIG. 7.

First of all, operations performed at the time of video reproduction are explained.

When a video is reproduced with this system, conditions of a video to be reproduced are first set in the video table 45.

At the start of video reproduction, conditions such as the number of channels, an encoding rate, etc. are input to the file system 40 [(1)]. The access unit determining unit 42 sets these conditions in the video table 45 [(2)]. Settings in the video table 45 will be described later.

Then, the accessing unit 41 calls the access unit determining unit 42 in response to a video reproduction request [(3)] issued according to an order of nearer processing time limits in a buffer [(4)]. The access unit determining unit 42 references the video table 45 [(5), (6)], determines the size of an access unit for the video to be reproduced based on the set conditions in the video table 45, and notifies the accessing unit 41 of the determined size [(7)]. A method determining the size of an access unit will be described later.

The accessing unit 41 verifies whether or not the encoding rate and the access unit satisfy the requested performance as a final stage of the preprocess for video reproduction. If there is no problem, the accessing unit 41 calls the block searching unit 43 [(8)-1]. The block searching unit 43 searches for the management block in which the video to be reproduced is recorded by referencing the management block table 46 [(9)-1, (10)-1], and notifies the accessing unit 41 of the search result [(11)-1].

The accessing unit 41 instructs the external storage device 30 to read the data by the access unit from the data within the corresponding management block [(12)]. As a result, the data is transferred from the external storage device 30 to the buffer arranged in the RAM 23. Thereafter, the above described operations (3) through (12) are repeated each time a video reproduction request is issued, until a video reproduction stop is notified.

Next, operations at the time of video recording are explained.

Figure 8:
FIG. 8 exemplifies recording/reproduction condition settings within a video table.

When a video is recorded with this system, conditions of a video to be recorded are first set in the video table 45 in a similar manner as in the reproduction. When the conditions such as the number of channels, an encoding rate, etc. are input to the file system 40 [(1)], the access unit determining unit 42 sets these conditions in the video table 45 [(2)]. FIG. 8 exemplifies recording/reproduction conditions set in the video table 45.

This figure exemplifies the settings in the video table 45 in the case where all of videos are recorded at the same encoding rate. In the video table 45, an average encoding rate for each video (each channel) processed by this system, identification between recording and reproduction (not shown. This point will be described later), and a video identifier for identifying each video are set by the access unit determining unit 42. The access unit determining unit 42 determines a video identifier for determining each video when setting conditions for each video (channel) in the video table 45, and also sets the encoding rate of the corresponding video along with the video identifier in the video table 45.

When video data is accumulated in a buffer, and expiration of its processing time limit approaches, a request to record the video data is issued to the file system 40. The accessing unit 41 calls the access unit determining unit 42 [(4)] in response to this request [(3)]. The access unit determining unit 42 references the video table 45 [(5), (6)], determines the size of the access unit for the video to be recorded based on the set conditions in the video table 45, and notifies the accessing unit 41 of the determined size [(7)]. The accessing unit 41 verifies whether or not the encoding rate and the access unit satisfy the maximum of the requested performance of the buffer as a final stage of the preprocess for video recording. If there is no problem, the accessing unit 41 instructs the external storage device 30 of the storage location, and to store the video data within the buffer.

When storing the video data in the external storage device 30, the file system 40 stores the video data by using the access unit as a basic unit. Furthermore, only video data of the same program is recorded within one management block at this time.

In response to the request to record the video data, the accessing unit 41 calls the block allocating unit 44 [(8)-2]. The block allocating unit 44 references the management block table 46, searches for a management block in which the video data is to be stored [(9)-2, (10)-2], and notifies the accessing unit 41 of the search result [(11)-2]. The accessing unit 41 instructs the external storage device 30 to write the data by the access unit to the target management block, based on the search result notified from the block allocating unit 44 [(12)]. As a result, the data the size of which is the access unit is transferred and written from the buffer arranged in the RAM 23 to the external storage device 30. Thereafter, the above described operations (3) through (12) are repeated each time a request to record a video is issued, until a video recording stop is notified.

The management block table 46 has a configuration such that a table member is arranged for each management block set in the storage area of the external storage device 30. Each member is in a one-to-one correspondence with a management block. Additionally, if video data stored in the external storage device 30 covers a plurality of management blocks, its connection order is represented by connection information within each member in the management block table 46.

When the block allocating unit 44 searches the management block table 46, it first verifies whether or not a management block which has still an empty space among the blocks allocated to the video to be recorded. If the last management block has an empty area among the management blocks allocated to the video, video data the size of which is the access unit is recorded in the empty area. If all of the allocated management blocks are used, a management block yet to be allocated is newly allocated to the video, and the video data the size of which is the access unit is recorded in this management block. After the video data by the single access unit is recorded in the management block, management information within the member corresponding to the management block in the management block table 46 is updated.

Figure 9:
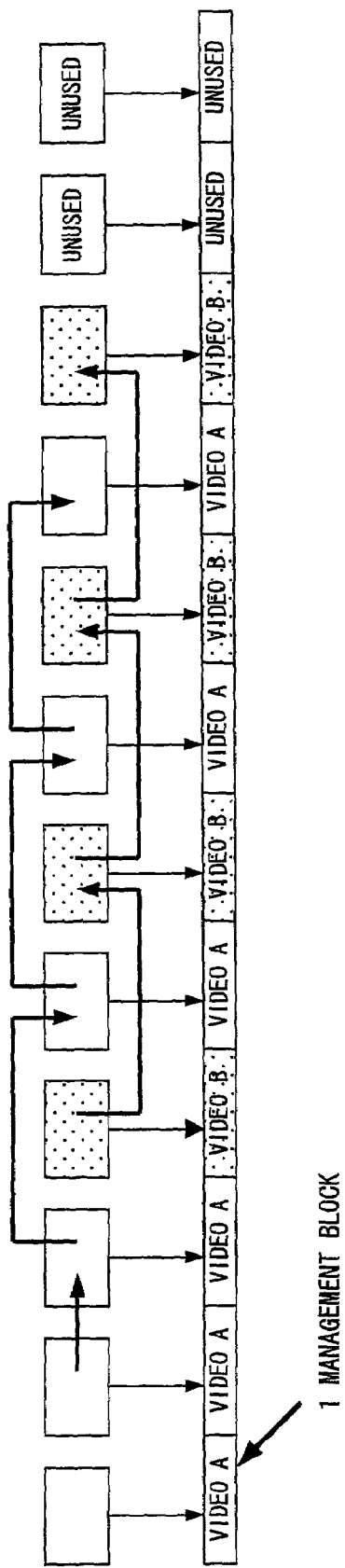
FIG. 9 shows the relationship between members configuring a management block table and respective management blocks.

FIG. 9 shows the relationship between members configuring the management block table 46 and respective management blocks.

The management block table 46 is configured by members each of which makes a one-to-one correspondence with each of the management blocks within the external storage device 30. Each of the members registers management information that indicates a connection relationship between a corresponding management block and another block and that indicates which video data is stored. When a video is reproduced, the block searching unit 43 traces the connection relationship in the management block table 46, and notifies the accessing unit 41 of the management block in which the corresponding video data is recorded.

Furthermore, the location of each member within the management block table 46 indicates to which management block the local member corresponds. The block searching unit 43 and the block allocating unit 44 identify a corresponding management block according to the location of the member within the management block table 46, that is, the ordinal number of the member. By way of example, when accessing the management information corresponding to the management block which is logically positioned at an "N"th location in the external storage device 30, the block searching unit 43 and the block allocating unit 44 access the management information within the "N"th member in the management block table "46".

FIG. 10 exemplifies the structure of a member configuring the management block table 46. In the case shown in FIG. 10, each member within the management block table 46 has a video identifier, the start address, the end address, and a pointer pointing to the next member as the management information of a corresponding management block.

The video identifier is an identifier indicating a video allocated to a management block, and corresponds to a video identifier within the video table 45. Only a corresponded video data of the same program is recorded in one management block. The video identifier is used as an identifier for uniquely determining and identifying the video corresponded to the management block.

The start address is an address indicating the starting position at which video data is recorded in a management block. The end address is an address indicating the end position at which the video data is recorded in the management block. When data is newly written to a management block, data by one access unit is recorded from the position next to the end address. The start and the end addresses are relative addresses within a management block, and their values range from 0 to the size of a management block. Additionally, the difference between the values of the start and the end addresses indicates the amount of data recorded in a management block, and the difference between the end address and the size of the management block indicates the size of an empty area in which no data is recorded. Furthermore, by setting a data unit managed by these start and end addresses to a small unit, such as one byte unit, the file system 40 can manage data within a management block in units of bytes.

The pointer pointing to the next member is the value of a pointer pointing to a member corresponding to a management block in which continued data of video data stored in the local management block is recorded. If data of one video is too large to be recorded in one management block, the video data is divided and stored in a plurality of management blocks. At this time, information indicating the connection of the video data is possessed as a value of the pointer pointing to the next member within the management block table 46. Each member within the management block table 46 is in a one-to-one correspondence with a management block. Therefore, the connection relationship between members is indicated by a pointer value within the management block table 46, whereby the connection relationship with the corresponding management block is indicated. If a management block is a block yet to be allocated or a block in which video data at the end of a video is recorded, not the value of the pointer pointing to the next member, but a control value indicating an unused block or the end of the video is stored in this portion.

Figure 11:
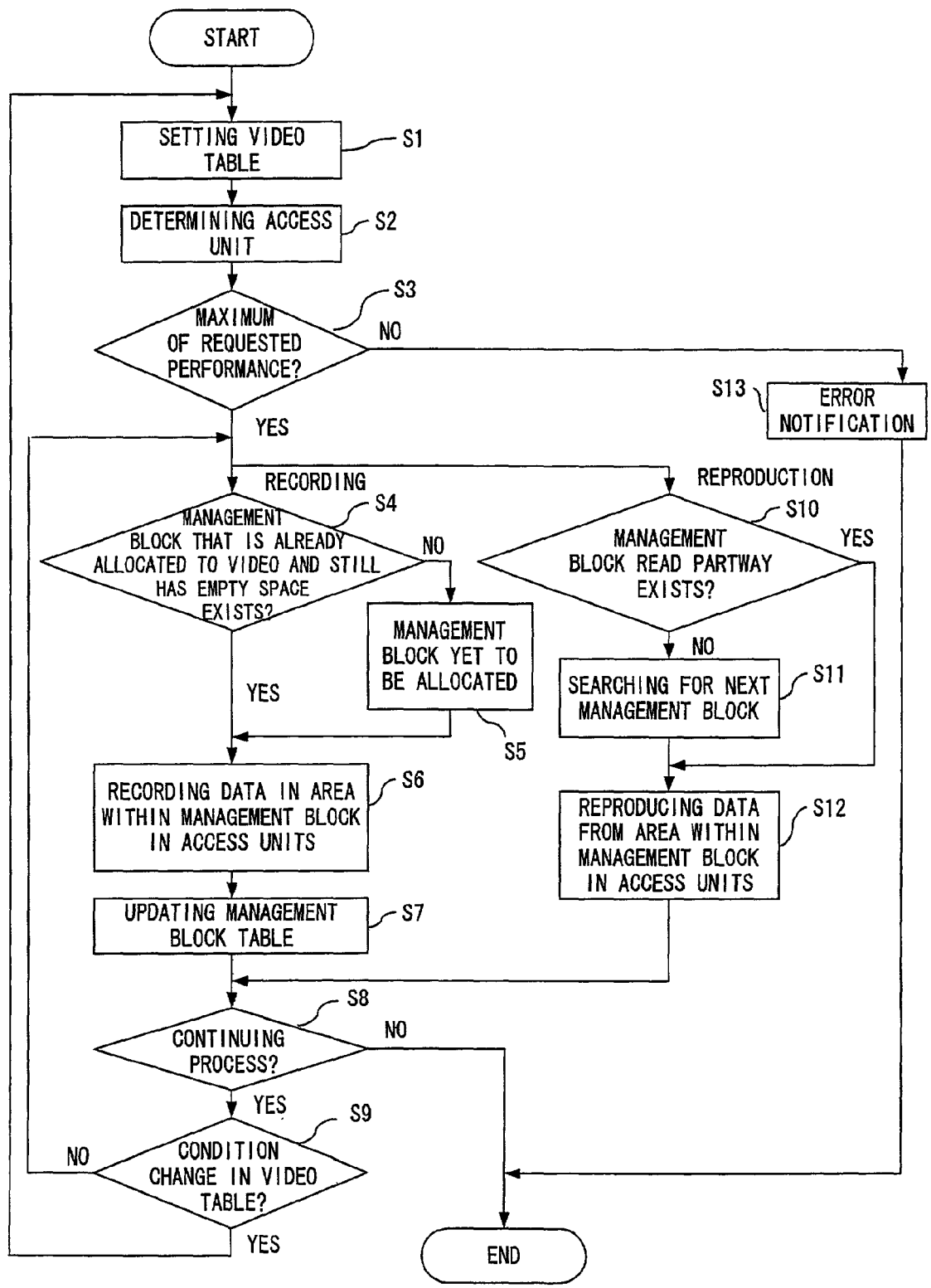
FIG. 11 is a flowchart showing the process performed by the file system when a video is recorded/reproduced.

FIG. 11 is a flowchart showing the process performed by the file system 40 when a video is recorded/reproduced.

When a video starts to be recorded/reproduced and the file system 40 is called in this host system, the access unit determining unit 42 first sets conditions such as an encoding rate, the number of channels, etc. in the video table 45 as a step S1 within the file system 40.

Next, as a step S2, the access unit determining unit 42 determines an access unit size according to the conditions set in the video table 45, and notifies the accessing unit 41 of the determined size.

The accessing unit 41 judges whether or not to be able to secure a sufficient buffer according to the access unit size notified from the access unit determining unit 42 (step S3). If the maximum of requested performance of the buffer is not satisfied, and a sufficient buffer cannot be secured ("NO" in step S3), the accessing unit 41 makes error notification as a step S13. Here, the process is terminated.

If the accessing unit judges that the sufficient buffer can be secured ("YES" in step S3), control is transferred to step S4 if the video is recorded, or to step S10 if the video is reproduced.

As the step S4 in the case where the video is recorded, the block allocating unit 44 searches for a management block that is allocated to the video to be recorded and still has an empty space by referencing the management block table 46. If such a management block is found ("YES" in step S4), this management block is determined to be a target block to which the data is to be written. If such a management block is not found ("NO" in step S4), a management block yet to be allocated is searched, and the searched block is newly allocated to the video to be recorded and determined to be a target block to which the data is to be written as a step S5.

As a step S6, data by the access unit size is recorded in the area of the management block determined to be the target block in step S4 or S5.

Then, data within the member corresponding to the management block in which the data is recorded within the management block table 46 is rewritten and updated (step S7).

Or, if the video is reproduced, it is judged whether or not there is a management block read partway as a step S10. If such a management block exists ("YES" in step S10), this management block is determined to be a target block from which the data is to be read. If such a management block does not exist ("NO" in step S10), the next management block is searched and determined to be the target block from which the data is to be read as a step S11.

Next, as a step S12, the accessing unit 41 instructs the external storage device 30 to read the data in access units from the corresponding area within the management block determined to be the target block in step S10 or S11, so that the video is reproduced.

If the recording/reproduction of the video is terminated ("No" in step S8), the process is completed. Or, if the process is continued without terminating the recording/reproduction ("YES" in step S8), the process goes back to step S1 if the recording/reproduction is made by changing the conditions such as the encoding rate, etc., which are set in the video table ("YES" in step S9). Or, the process goes back to step S4 if the conditions are not changed and the recording is continued, or to step S10 if the conditions are not changed and the reproduction is continued, so that the above described operations are repeated.

With the above described process, data of only one video is recorded in a management block, and the data is also erased in units of management blocks. Therefore, an empty area is not fragmented even if recording, reproduction, or erasure is repeated. Accordingly, storage efficiency can be prevented from being degraded, and the need for performing a defragmentation process can be eliminated. Additionally, by determining an access unit to be a size with which an overhead such as a seek time, a rotational latency, a time required for an I/O process, and a file system process, etc. of an external storage device can be ignored, a video can be recorded with no delay. Furthermore, since data read at one time is continuously recorded in one location also at the time of reproduction, the overhead such as a seek time, etc. of the external storage device 30 can be reduced.

Next, the method determining the size of an access unit is explained.

An access unit is determined based on conditions such as an encoding rate of a video to be recorded/reproduced, the number of channels, and the transfer performance of an external storage device.

An access unit size is determined, for example, based on the following equation.

Assume that the size of the access unit is B, the number of channels of videos desired to be recorded is C, the encoding rate of a video is $V_v$, the transfer speed of the external storage device is $V_d$, and the overhead of the external storage device is S. At this time, the access unit for recording the video without interruption must satisfy the following condition.

$$B > C \cdot V_v \cdot V_d \cdot S / (V_d - C \cdot V_v) \quad (1)$$

Here, the access unit has a size of 1/integer of a management block. Accordingly, the unit of 1/natural number of a size M of the management block, which satisfies the above provided condition, is used as the access unit size. By defining an access unit size to be a size of 1/integer of a management block, data can be filled within one management block. If the size B of the management block is represented as an equation, it is represented as follows.

$$B' = M/n > C \cdot V_v \cdot V_d \cdot S / (V_d - C \cdot V_v) \quad (2)$$

(n=a natural number equal to or larger than 1)

The access unit determining unit 42 selects a suitable size which satisfies the equation (2), and determines the selected size as an access unit.

The equations (1) and (2) can be derived from the following expression representing the relationship between the time limit of a video process and the transfer processing time of the external storage device.

the minimum of the time limit of a video process>total sum of the transfer processing time of the external storage device (the transfer unit of each video) (3)

where the time limit of a video process is the shortest time period until a buffer allocated to each channel overflows or underflows, and the total sum of the transfer processing time of the external storage device is the total sum of a time required for recording/reproducing data stored in a buffer for each video in access units. To record/reproduce a video without interruption, the expression (3) must be satisfied.

By modifying the conditional expression (3), the equations (1) and (2) derived previously can be obtained. The previous equations indicate a data amount that can be handled during the difference between the transfer speed of the external storage device and the total sum of encoding rates of videos desired to be processed, that is, a margin of the transfer process. Conditions such that this data amount does not exceed the total sum of the video data accumulated while the overhead of the external storage device is processed are obtained. If a conditional expression of an access unit is obtained by using the margin of the transfer processing speed, which is the difference between the data transfer speed of the external storage device and the total sum of encoding rates of the videos, the following expression is obtained.

access unit/data transfer speed of the external storage device=data transfer time by the access unit>overhead processing time that the external storage device requires to transfer data×total sum of the encoding rates of videos/margin of the transfer processing speed=processing time required for video data accumulated in a buffer while the overhead is processed (4)

By rearranging this conditional expression, the equations (1) and (2) are obtained.

The above description is provided based on the assumption that all of the encoding rates of videos that are simultaneously processed are the same. However, with the file system according to this preferred embodiment, also a plurality of videos with different encoding rates can be simultaneously processed.

If encoding rates are different depending on respective videos (respective channels), access units suitable for the respective encoding rates are determined, and the videos are recorded in management blocks in the determined access units.

Figure 12:
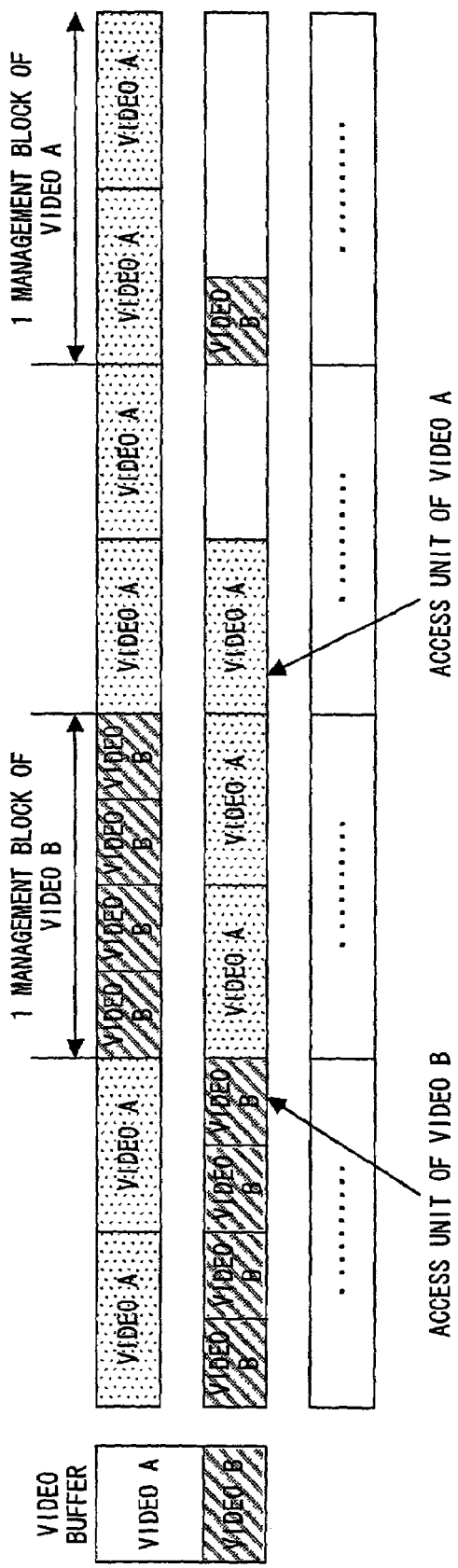
FIG. 12 shows the state of a storage area when video data are recorded at different encoding rates from a plurality of channels.

FIG. 12 shows the state of a storage area in the case where video data are recorded at different encoding rates from a plurality of channels. This figure shows the state of the storage area in the case where a video A and a video B the encoding rate of which is half the rate of the video A are simultaneously recorded.

Data of the videos A and B are recorded within respectively allocated management blocks by using a ½ management block and a ¼ management block, which are determined based on the respective encoding rates, as access units.

As is known from this figure, videos are recorded by allocating management blocks to the respective videos with this system. Therefore, data of a different video does not coexist within one management block. As a result, an area emptied by erasing or editing video data afterward does not become smaller than the size of a management block, so that the empty area is never fragmented. Therefore, even if videos with different encoding rates are simultaneously recorded, storage efficiency can be prevented from being degraded, and the need for making defragmentation is eliminated. This is because the videos are recorded without interruption, and their data are managed in units of management blocks.

If videos with different encoding rates are simultaneously processed, an access unit size for the data of each of the videos is determined by considering a condition that the total sum of the transfer processing time of the external storage device does not exceed the minimum value of the time limit of the video process, in a similar manner as in the above described case where the encoding rates are the same. For example, the access unit is determined according to the following conditional expression.

Assume that the access unit of each video is $B_i$, the number of channels of videos desired to be recorded is C, the encoding rate of a video is $V_{vi}$, the transfer speed of an external storage device is $V_d$, the overhead of the external storage device is S, and $\alpha = V_{vi}/\Sigma V_{vi}$. In this case, the size of the access unit of a video that is to be recorded from each of the channels without being interrupted must satisfy the following conditions. Note that "i" is a natural number from 1, 2, . . . , to C.

$$AVE(B) > C \cdot AVE(V_v) \cdot V_d \cdot S/(V_d - C \cdot AVE(V_v)) \quad (5)$$

$$B_i = \alpha_i \cdot AVE(B) \quad (6)$$

$$\because AVE(B) = \Sigma B_i / C$$

$$AVE(V_v) = \Sigma V_{vi}/C$$

$$B_i/V_{vi} = B_j/V_{vj} (i \neq j) \quad (7)$$

Note that $B_i/V_{vi} = B_j/V_{vj}$ is introduced in the conditional expression (7) in order to make the time limits of videos equal. However, this is not an essential condition. Additionally, the above described expressions assume the case where the transfer speed $V_d$ of data recording and that of data reproduction of the external storage medium, such as a hard disk, etc. are the same. The case where the transfer speed $V_d$ of data recording and that of data reproduction are different will be described later.

Furthermore, since the size of an actual access unit $B_i'$ results in 1/natural number of the size M of a management block as described above, the following unit is used.

$$B_i' = M/n_i > B_i \quad (8)$$

($n_i$=a natural number equal to or larger than 1)

Figure 13:
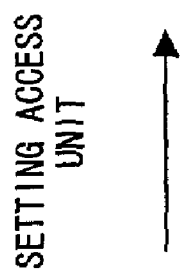
FIG. 13 exemplifies the settings of a video table when videos with access unit sizes that are different depending on respective channels are handled.

FIG. 13 exemplifies the video table 45 in the case where videos with access unit sizes that are different depending on channels are handled, such as in the case where videos with different encoding rates are recorded/reproduced from a plurality of channels, or the like.

In the case shown in this figure, the encoding rate of videos A and B is 8 Mbps, and that of videos C and D is 24 Mbps, that is, their encoding rates are different. In proportion, also the access unit of the videos A and B, and that of the videos C and D are respectively 256K and 768K bytes.

Furthermore, if recording and reproduction of videos coexist as shown in FIG. 13, it is necessary to consider the case where the transfer speed of recording and that of reproduction of an external storage device are different. If the transfer speed of recording and that of reproduction of the external storage device 30 are different, the above provided expression becomes as follows by assuming that the number of channels to be recorded is $C_w$, the number of channels to be reproduced is $C_r$, the data transfer speed at the time of recording is $V_{dw}$, and the transfer speed at the time or reproduction/recording is R.

$$AVE(B) > V_v \cdot R \cdot V_{dw} \cdot (C_r + C_w) \cdot S/(R \cdot V_{dw} - (C_r + R \cdot C_w) \cdot V_v) \quad (9)$$

Note that the conditional expression (7) is introduced in this example in order to make the time limits of videos equal.

Also when a plurality of channels are simultaneously recorded/reproduced, access units that satisfy the expressions (5) trough (8) are set in the case where the transfer speed of recording and that of reproduction of the external storage device 30 are the same, or access units that satisfy the expressions (7) through (10) are set in the case where the transfer speed of recording and that of reproduction are different. As a result, the videos can be recorded and reproduced without delay. Furthermore, when recording and reproduction are simultaneously made, video data recorded in the external storage device 30 is pre-examined, and access units are predetermined by obtaining the number of channels that can be reproduced, and the highest encoding rate of a video to be reproduced, so that the processing can be continued without interruption even if a recorded video is switched and reproduced while recording the videos of the plurality of channels.

Next, a condition change during video recording/reproduction is explained.

If a condition of a video is changed during the recording/reproduction of the video, for example, if the number of channels is increased/decreased, or if an encoding rate is changed partway of the recording/reproduction, the setting of the video table 45 is changed, and the access unit determining unit 42 recalculates an access unit size based on the changed setting value, and the processing is continued.

FIG. 14 exemplifies a change in the settings of the video table 45.

This figure shows the case where recording of a video B is suspended and that of a video E is alternatively started while videos A through D are recorded/reproduced, and also shows an example of a change in the video table 45 in the case where the encoding rate of the video B is changed.

If the recording/reproduction of a video is suspended partway in this figure, a corresponding member is erased and a new member having a video identifier 11 is added for an added video, as shown in a state 61 to a state 62 in the video table 45. Additionally, if a setting of a video being processed is changed, for example, an encoding rate of the video is changed, the setting of the corresponding member having a video identifier 2 within the video table 45 is changed as shown in the state 61 to a state 63, and the processing is continued. As a result, the video can be recorded/reproduced without delay even if the condition is changed partway of the processing. Furthermore, since data of each video is managed in management blocks, an empty area is not fragmented, which can eliminate the need for making defragmentation.

Next, erasure of video data is explained.

The file system according to this preferred embodiment erases video data recorded in the external storage device 30 in units of management blocks.

Figure 15:
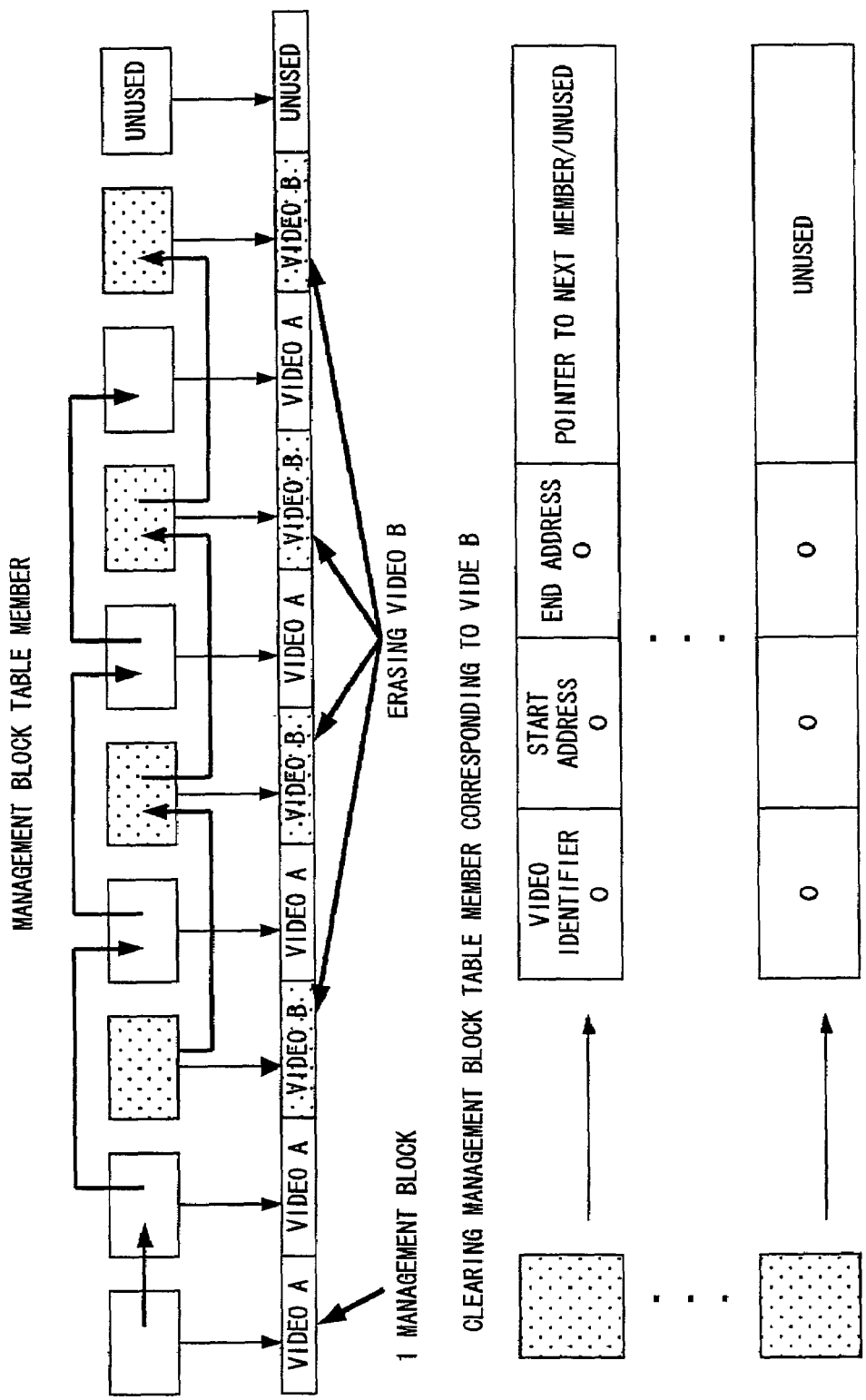
FIG. 15 explains the operations when video data is erased.

FIG. 15 explains the operations performed when video data is erased.

This figure exemplifies the case where a video B is erased from a state where videos A and B are recorded. In this case, all of members corresponding to the management blocks in which the video B is recorded within the management block table 46 are initialized (cleared).

In the case shown in this figure, the video B is recorded in four management blocks. Therefore, if the accessing unit 41 instructs the access unit determining unit 42 to erase the video B, the access unit determining unit 42 sequentially traces the corresponding four members within the video table 45 according to pointer values, sets "0" to a video identifier, and the start and end addresses of each of the members, and also sets a control value indicating "unused" to the value of a pointer pointing to the next member. As a result, all of the members are initialized.

As described above, video data is erased by initializing corresponding members within the management block table 46 in this preferred embodiment. This means that data erasure is performed in units of management blocks. Therefore, an area emptied by erasure results in the size of a management block even at a minimum, whereby the empty area is never fragmented despite the repetition of erasure and recording, and the need for making defragmentation is eliminated.

Next, a method determining a management block size is explained.

A management block size is determined to be a size, with which a time required for an overhead (a seek time, a rotational latency, an I/O process, and a file system process) can be absorbed and a sufficiently high transfer speed can be obtained between the external storage device 30 and the host system, so as to record/reproduce a video without delay even when random access is made to the external storage device 30.

A management block size is determined when the external storage device 30 is initialized (formatted).

The file system according to this preferred embodiment first examines the random access performance of the external storage device 30 at the time of formatting, and obtains the relationship of the data transfer unit and the transfer speed between the data transfer unit and the host system.

Figure 16:
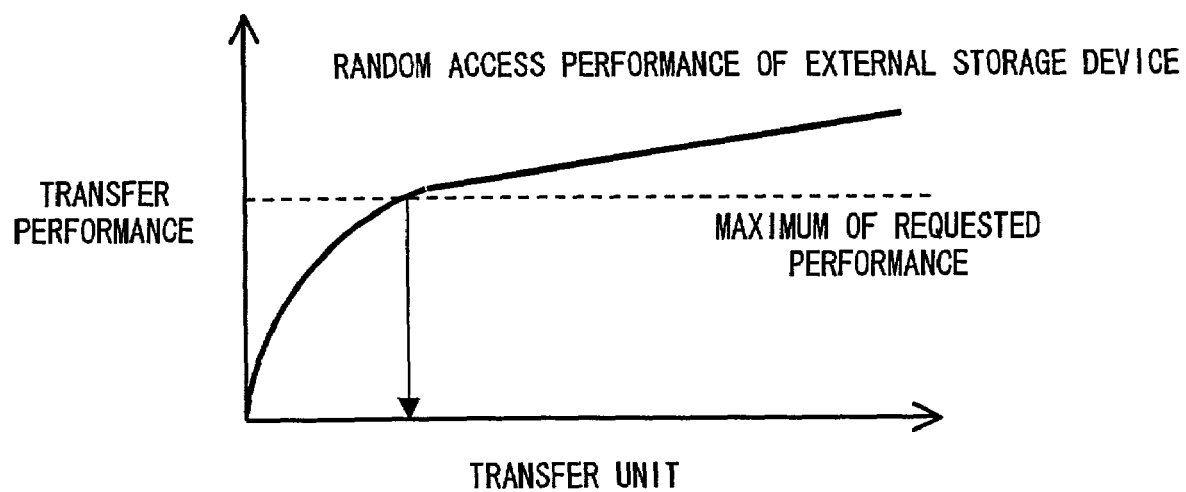
FIG. 16 is a graph showing the relationship between a transfer unit size and transfer performance of an external storage device.

FIG. 16 is a graph showing the relationship between the size of a transfer unit and transfer performance of the external storage device 30.

First of all, the management block determining unit 48 obtains the transfer performance of each transfer unit by varying the transfer unit of the external storage device 30, and defines the obtained transfer performance to be the random access performance of the external storage device 30.

Normally, for a drive of a random access medium such as a hard disk, an MO disk, etc., the longest processing time is required when an access is made while seeks are being made from the inner tracks to the outer tracks (or vice versa) of the disc-shaped storage medium. Therefore, the performance at this time is defined to be the random access performance. To evaluate the random access performance, not the performance of the external storage device 40 alone, but the entire performance including also the I/O overhead and the processing time of the file system between the host system and the external storage device 30 is examined as a target. Furthermore, the transfer speed of data read and that of data write may be different depending on the type of the external storage device 30. In this case, the random access performance is evaluated based on the operation with lower transfer speed (normally, the write operation).

Next, the evaluated random access performance is compared with the maximum of requested performance of the system.

As the maximum of requested performance, the total sum of encoding rates of videos desired to be processed simultaneously is used. If the total sum varies depending on a condition, the maximum value at that time is used. For instance, if 1 channel is desired to be reproduced while simultaneously recording 8-Mbps videos from 3 channels, or while recording a 24-Mbps video from one channel, 24 Mbps (24 Mbps×1 channel recording or 8 Mbps×3 channels simultaneous recording)+24 Mbps (1 channel reproduction) =48 Mbps is the maximum of requested performance.

Then, the data transfer unit (an arrow portion shown in FIG. 16) at an intersection point of the random access performance and the maximum of requested performance is examined, and a management block is set to at least a size equal to or larger than this unit. As a result, a video stored in the external storage device is managed with at least the size of the management block, whereby the video can be recorded/reproduced without interrupting the data transfer even at a random access.

If there is no intersection point of the random access performance and the maximum of requested performance, it means that the external storage device 30 does not comprise performance which satisfies a request to record/reproduce video data. Therefore, a change in the requested performance, such as a change in an encoding rate, or a replacement of the external storage device 30 is made.

Figure 17:
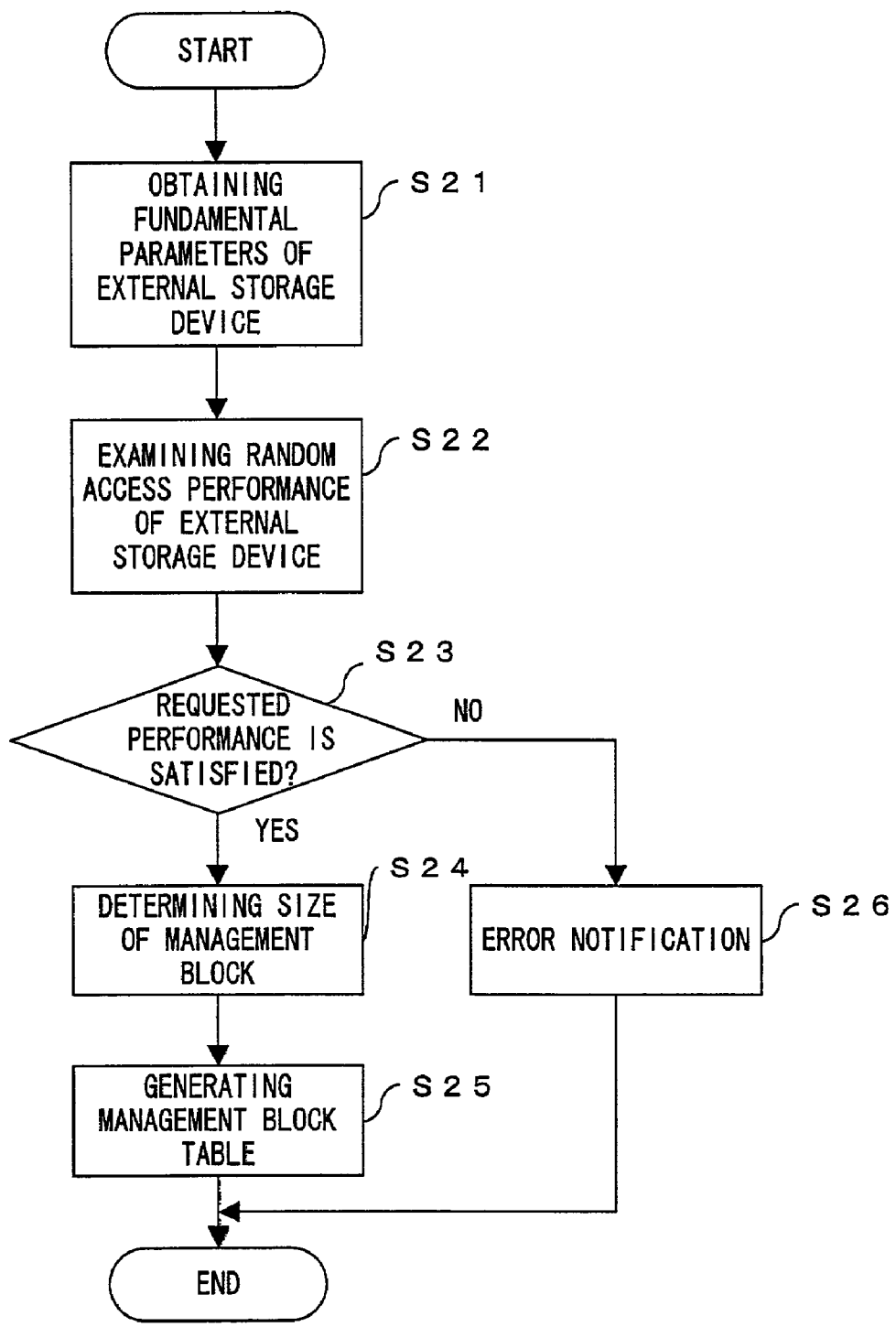
FIG. 17 is a flowchart showing the process determining the size of a management block, which is performed in response to a request to format an external storage device.

FIG. 17 is a flowchart showing the process determining the size of a management block, which is performed in response to a request to format the external storage device 30.

When the format request is issued, the formatting unit 47 calls the management block determining unit 48. The management block determining unit 48 obtains fundamental parameters of the external storage device 30, such as a capacity, a sector size, etc., from the external storage device 30 as a step S21.

Next, the management block determining unit 48 examines the random access performance of the external storage device 30 as a step S22, and judges whether or not the random access performance satisfies requested performance (step S23). If the random access performance of the external storage device 30 does not satisfy the requested performance ("No" in step S23), a change in an encoding rate, etc. is prompted by making an error notification as a step S26. Then, the process is terminated. If the random access performance satisfies the requested performance ("YES" in step S23), the size of a management block is determined to be a suitable size with which random access performance satisfying the maximum of the requested performance can be obtained, and the determined size is notified to the formatting unit 47 as a step S24.

The formatting unit 47 formats the external storage device 30 based on the management block size notified from the management block determining unit 48, and generates the management block table 46 as a step S25. Here, the process is terminated.

Next, editing for a video recorded in an external storage device is explained.

As one of the characteristics of a storage device implemented by a random access medium, a characteristic such that editing of recorded data is easy can be cited.

Figure 18:
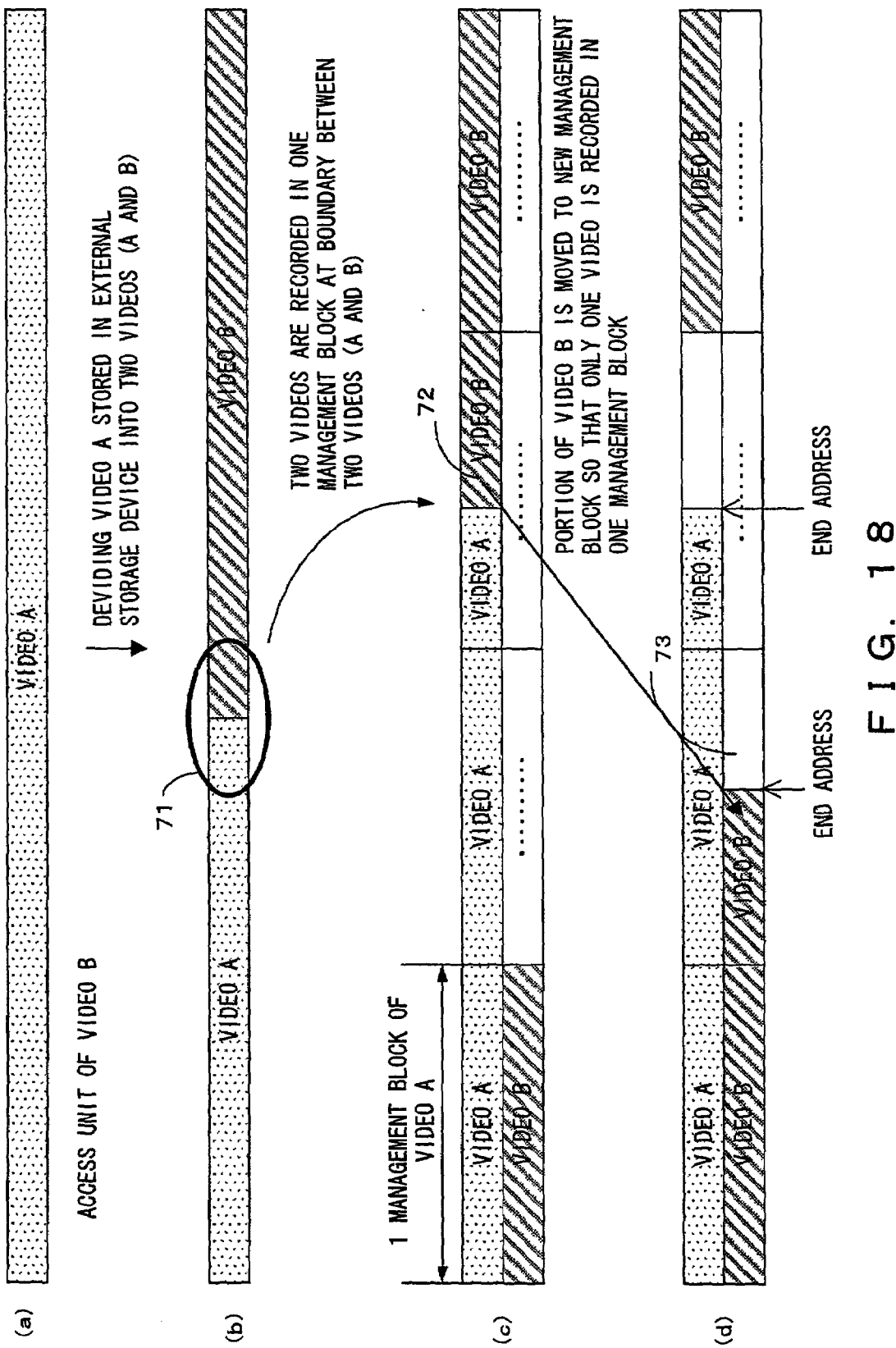
FIG. 18 shows the process performed when video data for one video is divided into two.

FIG. 18 shows the process performed when data of one video is divided into two pieces, as an example of an editing process in this preferred embodiment.

Suppose that a video A which is recorded in the external storage device 30 as shown in (a) of FIG. 18 is edited and divided into two pieces as shown in (b) of this figure, and the latter portion is a video B. At this time, there is a possibility that data of both of the videos A and B are stored in one management block at a boundary 71 between the videos A and B.

With the file system according to this preferred embodiment, video data is managed in units of management blocks by storing data of one video data of the same program in one management block. Accordingly, a change is made in a way such that the data of the video B is moved from the management block 72, in which the data of the two types of the videos A and B are stored by the editing, to an unused management block 73 as shown in (c) and (d) of FIG. 17, and the data are divided into the two blocks. Note that the portion in which the video data is stored and an unused portion coexist in the management blocks 72 and 73. The end of the portion in which the video data is stored is managed with the end address of the corresponding member within the management block table 46.

FIGS. 19A through 19D show the process performed when a halfway portion of a video is deleted, as another example of the editing process in this preferred embodiment.

This is an example of the process performed when a halfway portion is deleted from a video A recorded in the external storage device 30, as shown in FIG. 19A.

Such an editing process can be implemented by updating the management block table 46.

FIG. 19B represents the members within the management block table 46, which correspond to the management blocks in which the video A is stored. In this case, a pointer pointing to the next member within a management block 82 is changed to point to a member 88 from the above described state, so that management blocks 81 and 87, which are positioned at both ends of the deleted portion as shown in FIG. 19C, are connected. Furthermore, members 84 and 86 corresponding to the deleted management blocks 84 and 86 are cleared and set to an unused state, and at the same time, the end address of the member 82 and the start address of the member 88 are respectively changed to point to the end and the start portions of the corresponding management block in which the video data is stored.

If the size obtained by merging the video data within the management blocks 81 and 87 is smaller than that of the management block in the above described process, the editing process is performed to merge the video data within the two management blocks into one, which is to be stored in one management block 89 as shown in FIG. 19D. As a result, the video data can be recorded more efficiently. Furthermore, the management block table 46 is rewritten in a similar manner as in the above described process performed when a halfway portion is deleted, and a connection between management blocks is changed, whereby one video data can be also generated with ease by editing data of a plurality of pieces of video data with a change made in a connection between management blocks.

As described above, with the file system according to this preferred embodiment, video data recorded in the external storage device 30 can be edited with ease only by rewriting the management block table 46. Additionally, video data stored in each management block can be managed in bytes in the corresponding member within the management block table 46. Accordingly, data can be edited in a small unit.

Figure 20:
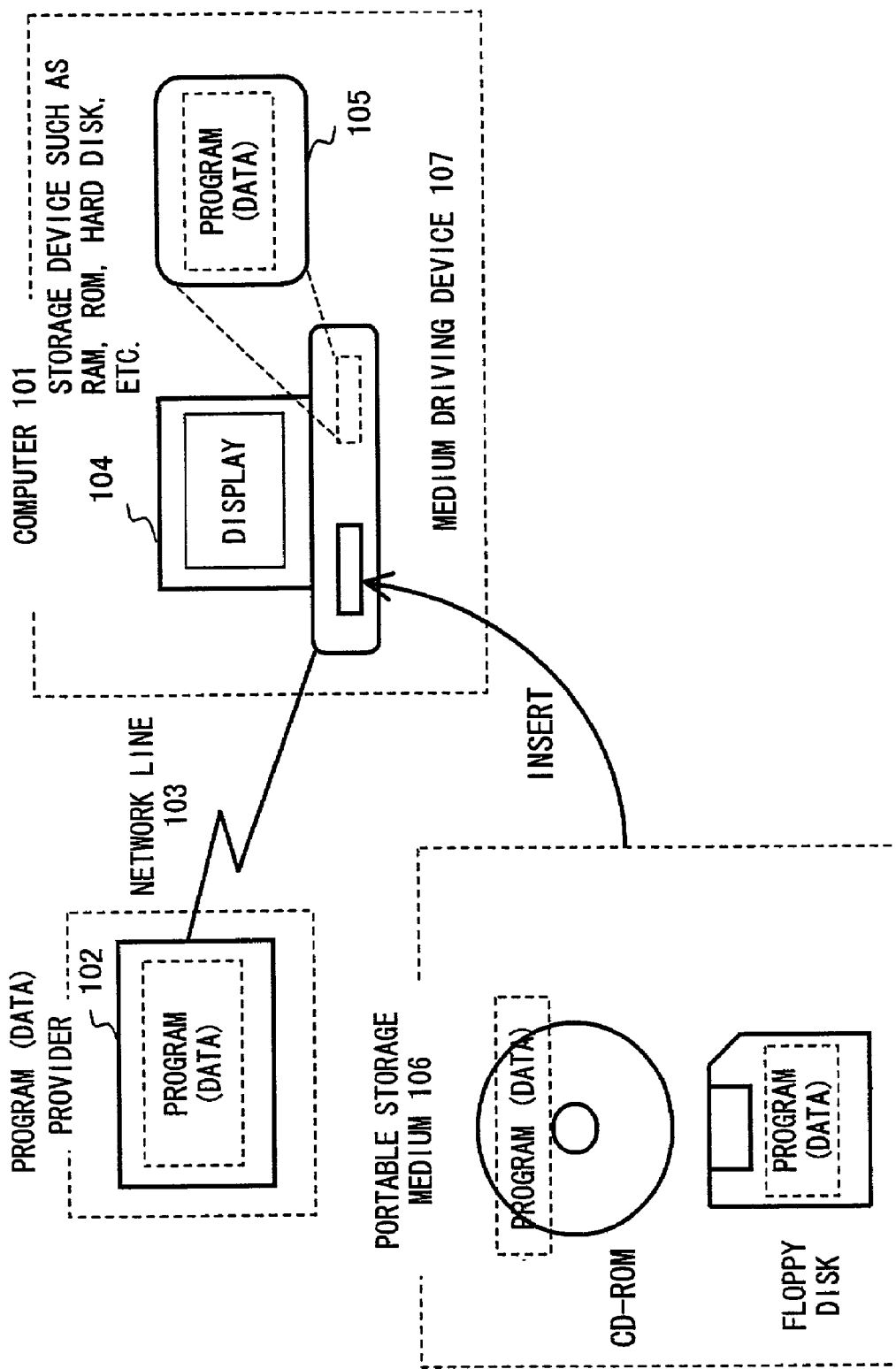
FIG. 20 exemplifies storage media.

FIG. 20 exemplifies storage media storing data for implementing the file system according to this preferred embodiment in the host system shown in FIG. 4.

The host system shown in FIG. 4 comprises a medium reading device not shown. Part or the whole of a program or data loaded from the medium reading device may be loaded into a main storage device or an auxiliary storage device, and a CPU 21 performs its operations based on the loaded program or data, so that the file system according to this preferred embodiment can be also implemented.

At this time, the program or data is sometimes exchanged by using a storage medium such as a floppy disk, a CD-ROM, etc. in the host system. Accordingly, the present invention is not limited to the file system or the method managing a storage area. The present invention may be implemented as a computer-readable storage medium for causing a computer to execute the capabilities of the above described preferred embodiment according to the present invention, when used by the computer.

In this case, examples of the storage medium include not only a portable storage medium 106 accessed by a medium driving device 107, such as a CD-ROM, a floppy disk (or an MO, a DVD, a removal hard disk, etc. may be available), but also a storage unit 102 (a database, etc.) within an external device (a server, etc.), from which the program or data is transmitted via a network line 103, or a memory 105 (RAM or a hard disk, etc.) within a main body 104 of a computer 101. The program stored onto the portable storage medium 106 or in the storage unit 102 (the database, etc.) is loaded into the memory (the RAM, the hard disk, etc.) 105, and executed.

According to the present invention, videos can be recorded/reproduced with high efficiency even from a plurality of channels.

Additionally, since only one video type is recorded in one management block, a recorded video can be managed in units of management blocks. Consequently, an empty area is never fragmented even if recording, reproduction or erasure is repeated. Accordingly, storage efficiency can be prevented from being degraded, and the need for making defragmentation can be eliminated.

Furthermore, an access unit is determined to be a sufficiently large size with which an overhead can be ignored, so that a video can be recorded without delay.

Still further, a video is erased in units of management blocks, whereby an empty area is never fragmented even if erasure and recording are repeated.

Still further, a video recorded in a storage device is managed with the size of a management block, thereby recording/reproducing the video without interruption even at a random access.

What is claimed is:

1. A file system for a device simultaneously recording/reproducing video(s) in/from a randomly accessible storage unit from at least one channel, comprising:
    an access unit determining unit determining an access unit, which is a size of an access made to the storage unit, for each video to be recorded/reproduced; and
    an accessing unit recording a video in the access unit so that only video data of a same program is recorded in each management block set in a storage area of the storage unit, when the video is recorded in the storage unit.

2. The file system according to claim 1, wherein
    said access unit determining unit determines the access unit a size of which satisfies a condition that
    a transfer time of data by the access unit>a processing time of data accumulated during an overhead processing time that the storage unit requires to transfer data.

3. The file system according to claim 1, wherein
    said access unit determining unit determines the access unit a size of which satisfies a condition that
    the access unit/a data transfer speed of the storage unit>an overhead processing time that the storage unit requires to transfer data×total sum of encoding rates of data/a margin of a transfer processing speed.

4. The file system according to claim 1, wherein
    the access unit is a size of 1/natural number of a size of the management block.

5. The file system according to claim 1, further comprising
    a data erasing unit erasing a video stored in the storage unit in units of management blocks.

6. The file system according to claim 1, further comprising:
a management block determining unit determining a size of the management block according to random access performance of the storage unit and a maximum of access requested performance of the storage unit; and
a formatting unit initializing the storage unit based on the size of the management block, which is determined by said management block determining unit.

7. The file system according to claim 6, wherein
said management block determining unit measures the random access performance of the storage unit, and determines the size of the management block in comparison with the maximum of requested performance.

8. The file system according to claim 1, further comprising
a video table storing conditions for determining the access unit, wherein
said access unit determining unit determines the access unit by referencing said video table.

9. The file system according to claim 8, further comprising
a condition changing unit changing a condition for determining the access unit within said video table while a video is recorded/reproduced, wherein
said access unit determining unit newly determines the access unit in order to cope with a change in the condition, which is made by said condition changing unit.

10. The file system according to claim 1, wherein
conditions for determining the access unit include the number of channels, and an encoding rate of each video.

11. The file system according to claim 1, further comprising
a management block table to which management information for each management block is registered.

12. The file system according to claim 11, further comprising
a block allocating unit allocating a management block having an unused or an empty area as a target block, in which a video is to be registered by referencing said management block table, in response to a request to record the video, wherein
said accessing unit records the video in the management block allocated by said block allocating unit.

13. The file system according to claim 11, further comprising
a block searching unit searching for a management block, in which a corresponding video is recorded, by referencing said management block table, in response to a request to reproduce the video, wherein
said accessing unit reads the video from the management block searched by said block searching unit.

14. The file system according to claim 11, further comprising
an editing unit editing a video by changing information indicting a connection between management blocks, which is included in the management information.

15. A file system for a device simultaneously accessing a randomly accessible storage unit from a plurality of channels, comprising:
an access unit determining unit determining an access unit, which is a size when an access is made to the storage unit for each of the plurality of channels based on conditions for reading/writing data from/to the storage unit; and
accessing unit reading/writing data by the access unit determined for each of the plurality of channels in an order of nearer processing time limits in response to a request to read/write data from the plurality of channels.

16. The file system according to claim 15, wherein
said accessing unit write the data to each management block set in a storage area of the storage unit, so that only data from one channel is recorded in one management block, in response to a request to write the data.

17. A file system for a device simultaneously recording/reproducing video(s) in/from randomly accessible storage means from at least one channel, comprising:
access unit determining means for determining an access unit, which is a size of an access made to the storage unit, for each video to be recorded/reproduced; and
accessing means for recording a video in the access unit so that only video data of a same program is recorded in each management block set in a storage area of the storage means, when the video is recorded in the storage unit.

18. A file system for a device simultaneously accessing randomly accessible storage means from a plurality of channels, comprising:
access unit determining means for determining an access unit, which is a size when an access is made to the storage means for each of the plurality of channels based on conditions for reading/writing data from/to the storage means; and
accessing means for reading/writing data by the access unit determined for each of the plurality of channels in an order of nearer processing time limits in response to a request to read/write data from the plurality of channels.

19. A method managing a storage area of a randomly accessible storage unit that is accessed simultaneously from one or more channels, comprising:
setting a plurality of management blocks in the storage area;
determining an access unit, which is a size of an access made to the storage unit; and
recording a video in the access unit so that only video data of a same program is recorded in one management block, when the video is recorded in the storage unit.

20. A computer-readable storage medium on which is recorded a program for causing a computer accessing a randomly accessible storage unit that is simultaneously accessed from at least one channel to execute a process, said process comprising:
determining an access unit, which is a size of an access made to the storage unit; and
recording data in the access unit so that only data from one channel is recorded in one management block among management blocks set in a storage area of the storage unit, when the data is recorded in the storage unit.

21. A computer-readable storage medium on which is recorded a program for causing a computer accessing a randomly accessible storage unit that is simultaneously accessed from at least one channel to execute a process, said process comprising:
examining random access performance of the storage unit;

obtaining a size of a management block by making a comparison between the random access performance and a total sum of encoding rates of simultaneously accessed videos; and setting a management block having an obtained size in the storage unit.

* * * * *